US012587476B2

(12) United States Patent (10) Patent No.: US 12,587,476 B2
Wang et al. (45) Date of Patent: Mar. 24, 2026

(54) METHOD AND APPARATUS FOR PUBLISHING AN RT-5G ROUTING MESSAGE, STORAGE MEDIUM AND ELECTRONIC APPARATUS

(71) Applicant: ZTE Corporation, Shenzhen (CN)

(72) Inventors: Yubao Wang, Shenzhen (CN); Ye Shu, Shenzhen (CN); Zheng Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 286 days.

(21) Appl. No.: 18/685,581

(22) PCT Filed: Jul. 20, 2022

(86) PCT No.: PCT/CN2022/106719
§ 371 (c)(1),
(2) Date: Feb. 22, 2024

(87) PCT Pub. No.: WO2023/024768
PCT Pub. Date: Mar. 2, 2023

(65) Prior Publication Data
US 2024/0356843 A1 Oct. 24, 2024

(30) Foreign Application Priority Data

Aug. 25, 2021 (CN) .......................... 202110984683.9

(51) Int. Cl.
*H04L 45/74* (2022.01)
*H04L 45/00* (2022.01)
*H04L 45/76* (2022.01)
(52) U.S. Cl.
CPC .............. *H04L 45/74* (2013.01); *H04L 45/22* (2013.01); *H04L 45/66* (2013.01); *H04L 45/76* (2022.05)

(58) Field of Classification Search
CPC ......... H04L 45/74; H04L 45/22; H04L 45/66; H04L 45/76; H04L 45/02; H04L 12/12; H04L 45/50
See application file for complete search history.

(56) References Cited

U.S. PATENT DOCUMENTS

2017/0171057 A1* 6/2017 Dong ..................... H04L 45/033
2020/0067830 A1* 2/2020 Malhotra .............. H04L 45/586

FOREIGN PATENT DOCUMENTS

CN 107566265 A 1/2018
CN 109861924 A 6/2019
(Continued)

OTHER PUBLICATIONS

IP Prefix Advertisement in EVPN (draft-ietf-bess-evpn-prefix-advertisement-05 (Year: 2017).*
(Continued)

*Primary Examiner* — Tan Doan
(74) *Attorney, Agent, or Firm* — CANTOR COLBURN LLP

(57) ABSTRACT

Provided are a method and an apparatus for publishing an RT-5G routing message, a storage medium and an electronic apparatus. The method includes: publishing, by a first device, an RT-5G routing message for a CE-Prefix to enable a low-end RT-5 node to receive the RT-5G routing message, where a GW-IP field of the RT-5G routing message carries a first IP; a next hop of Overlay of the CE-Prefix is a second IP, and the second IP is allowed to be reached by means of a node to which the first IP belongs; the RT-5G routing message is configured to instruct the low-end RT-5 node to analyze the GW-IP field carried in the RT-5G routing message into an RT-2 route; and the second IP is not in a directly-connected subnet of an EVPN.

20 Claims, 4 Drawing Sheets

(56)  References Cited

FOREIGN PATENT DOCUMENTS

| | | | |
|---|---|---|---|
| CN | 111786884 A | 10/2020 | |
| CN | 113242181 A | 8/2021 | |
| WO | 2017032300 A1 | 3/2017 | |
| WO | WO-2020200200 A1 * | 10/2020 | ......... H04L 12/4633 |

OTHER PUBLICATIONS

European Search Report for corresponding application 22 86 0114: Mail date Dec. 3, 2024.

Rabadan, "Applicability of EVPN to NVO3 Networks", Jul. 8, 2019, pp. 1-26, XP015134094.

Rabadan, et al., IP Prefix Advertisement in EVPN, No., 11, May 18, 2018, pp. 1-36, XP015126445.

Rabadan, Jorge, draft-ietfd-bess-evpn-prefix-advertisement-10, IP Prefix Advertisement in EVPN, Feb. 27, 2018.

Wang Zhang, "ARP/ND Synching and IP Aliasing without IRB . . ."Aug. 9, 2021, pp. 1-19, XP015147333.

Wang, Yubao, Draft-wang-bess-evpn-ether-tag-id-usage-02, Ethernet Tag ID Usage Update for Ethernet A-D per EVI Route, Aug. 23, 2021.

International Search Report for corresponding application PCT/CN2022/106719 filed Jul. 20, 2022; Mail date Oct. 26, 2022.

\* cited by examiner

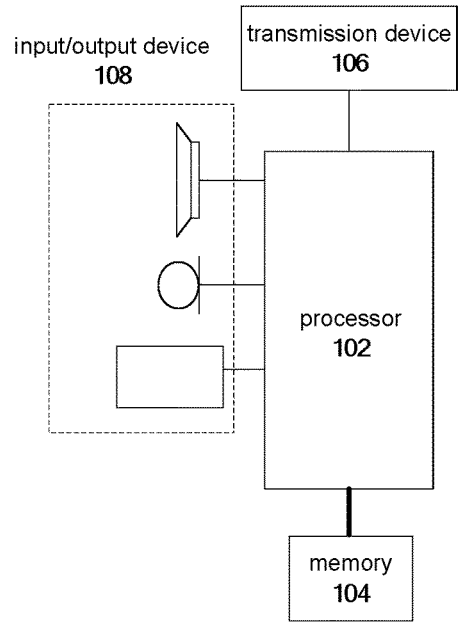

input/output device
108 transmission device
106 processor
102 memory
104

Fig. 1 a first device publishes an RT-5G routing message for a CE-Prefix to enable a low-end RT-5 node to
receive the RT-5G routing message. A GW-IP field of the RT-5G routing message carries a first IP; a
next hop of Overlay of the CE-Prefix is a second IP, and the second IP is allowed to be reached by
means of a node to which the first IP belongs; the RT-5G routing message is configured to instruct the
low-end RT-5 node to analyze the GW-IP field carried in the RT-5G routing message into an RT-2 route;
and the second IP is not in a directly-connected subnet of an EVPN

S202

Fig. 2 a first device publishes an RT-5 routing message for a CE-Prefix to enable a low-end RT-5 node to
receive the RT-5 routing message. An ESI field of the RT-5 routing message carries a first ESI; a next
hop of Overlay of the CE-Prefix is a second IP, and the second IP is allowed to be reached by means of a
node to which the first ESI belongs; and the RT-5 routing message is configured to instruct the low-end
RT-5 node to analyze the ESI field carried in the RT-5 routing message into an RT-1 route

METHOD AND APPARATUS FOR PUBLISHING AN RT-5G ROUTING MESSAGE, STORAGE MEDIUM AND ELECTRONIC APPARATUS

CROSS-REFERENCE TO RELATED APPLICATION

The present disclosure is a national stage filing under 35 U.S.C. § 371 of international application number PCT/CN2022/1719, filed Jul. 20, 2022, which claims priority to Chinese Patent Application No. 202110984683.9 filed to the China National Intellectual Property Administration on Aug. 25, 2021, the disclosure of which is hereby incorporated by reference in its entirety.

TECHNICAL FIELD

The present disclosure relates to the field of communications, and specifically to a method and an apparatus for publishing an RT-5G routing message, a storage medium and an electronic apparatus.

BACKGROUND

In a Data Center (DC), when a DC Gateway (DGW) learns a private network prefix behind a Customer Edge (CE) (that is, CE-Prefix) from a CE device, a next hop of a private network of the CE-Prefix is a loopback address IP1 on the CE. If the DC GW publishes an RT-5G route for the CE-Prefix, the IP1 is directly used as a GW-IP field of the RT-5G route (for ease of expression, the RT-5G route may be called an original RT-5G route or an RT-5G route without proxy), then a node (for example, TOR1) of the RT-5G route is received, and a corresponding RT-2 route cannot be analyzed by only performing iteration once in IP-VRF according to the GW-IP, such that iteration needs to be performed again in an IP-VRF route table according to a next hop IP address that is found according to the first iteration. In this case, the TOR1 needs to have high performance. If the TOR1 is a node (i.e., a low-end RT-5 node) with low processing performance for the RT-5G route, the forwarding efficiency of a message will be affected.

For correlation techniques, no effective solutions have been proposed for the problem that the low-end RT-5 node cannot be efficiently forwarded to a data message of the CE-Prefix according to the RT-5G route.

Therefore, it is necessary to improve the correlation techniques to overcome defects in the correlation techniques.

SUMMARY

Embodiments of the present disclosure provide a method and an apparatus for publishing an RT-5G routing message, a storage medium and an electronic apparatus, so as to at least solve the problem that a limited node cannot be forwarded to a data message of a Customer Edge (CE)-Prefix according to an RT-5G route.

An aspect of an embodiment of the present disclosure provides a method for publishing an RT-5G routing message, which includes: publishing, by a first device, an RT-5G routing message for a CE-Prefix to enable a low-end RT-5 node to receive the RT-5G routing message.

Another aspect of an embodiment of the present disclosure further provides a method for publishing an RT-5 routing message, which includes: publishing, by a first device, an RT-5 routing message for a CE-Prefix to enable a low-end RT-5 node to receive the RT-5 routing message, where an Ethernet Segment Identifier (ESI) field of the RT-5 routing message carries a first ESI; a next hop of Overlay of the CE-Prefix is a second Internet Protocol (IP), and the second IP is allowed to be reached by means of a node to which the first ESI belongs; the RT-5 routing message is configured to instruct the low-end RT-5 node to analyze the ESI field carried in the RT-5 routing message into an RT-1 route; and sending the RT-5 routing message to a third device.

Another aspect of an embodiment of the present disclosure further provides an Apparatus for publishing an RT-5G routing message, which is applied to a first device and includes: a first publishing module, configured to publish an RT-5G routing message for a CE-Prefix to enable a low-end RT-5 node to receive the RT-5G routing message. A GW-IP field of the RT-5G routing message carries a first IP; a next hop of Overlay of the CE-Prefix is a second IP, and the second IP is allowed to be reached by means of a node to which the first IP belongs; the RT-5G routing message is configured to instruct the low-end RT-5 node to analyze the GW-IP field carried in the RT-5G routing message into an RT-2 route; and the second IP is not in a directly-connected subnet of an EVPN.

Another aspect of an embodiment of the present disclosure further provides an apparatus for publishing an RT-5 routing message, which includes: a second publishing module, configured to publish an RT-5 routing message for a CE-Prefix to enable a low-end RT-5 node to receive the RT-5 routing message, where an ESI field of the RT-5 routing message carries a first ESI; a next hop of Overlay of the CE-Prefix is a second IP, and the second IP is allowed to be reached by means of a node to which the first ESI belongs; the RT-5 routing message is configured to instruct the low-end RT-5 node to analyze the ESI field carried in the RT-5 routing message into an RT-1 route; and send the RT-5 routing message to a third device.

Another aspect of an embodiment of the present disclosure further provides a computer-readable storage medium. The computer-readable storage medium stores a computer program. Any one of the methods is executed when the computer program is configured to be operated.

Another aspect of an embodiment of the present disclosure further provides an electronic apparatus, which includes a memory, a processor, and a computer program which is stored in the memory and executable on the processor. The processor executes any one of the methods by means of the computer program.

By means of the present disclosure, according to the method, the first device publishes the RT-5G routing message for the CE-Prefix to enable the low-end RT-5 node to receive the RT-5G routing message; the GW-IP field of the RT-5G routing message carries the first IP; the next hop of Overlay of the CE-Prefix is the second IP, and the second IP is allowed to be reached by means of the node to which the first IP belongs; and the RT-5G routing message is configured to instruct the low-end RT-5 node to analyze the GW-IP field carried in the RT-5G routing message into the RT-2 route. By means of using a mechanism of replacing the value of the GW-IP in the RT-5G route, the problem that a routing sender announces the RT-5G route to a receiving end for the CE-Prefix of a CE when the low-end RT-5 node as the receiving end is not updated is solved, which is the problem that a limited node cannot be forwarded to a data message of the CE-Prefix according to the RT-5G route. Furthermore, the RT-5G route does not cause the corresponding data message to bypass via a GW (the CE is not adjacent to the GW).

BRIEF DESCRIPTION OF THE DRAWINGS

The accompanying drawings described herein are used to provide a further understanding of the present disclosure, and constitute a part of the present disclosure. The exemplary embodiments of the present disclosure and the description thereof are used to explain the present disclosure, but do not constitute improper limitations to the present disclosure. In the drawings:

FIG. 1 is a block diagram of a hardware structure of a computer terminal of a method for publishing an RT-5G routing message according to an embodiment of the present disclosure.

FIG. 2 is a flowchart of a method for publishing an RT-5G routing message according to an embodiment of the present disclosure.

FIG. 3 is a flowchart of a method for publishing an RT-5 routing message according to an embodiment of the present disclosure.

DETAILED DESCRIPTION OF THE EMBODIMENTS

Figure 4:
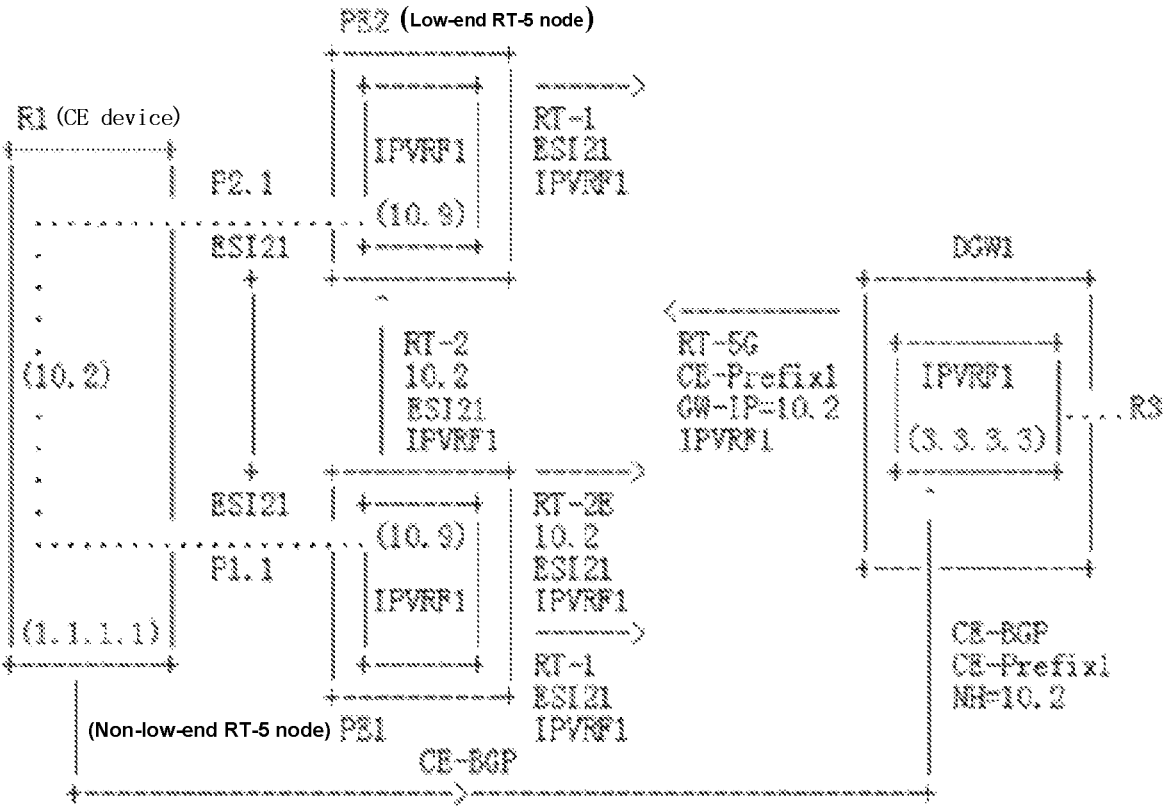
FIG. 4 is a schematic diagram of an RT-5G route iteration process for a Top of Rack (TOR) proxy by means of a DGW according to an embodiment of the present disclosure.

In order to enable those skilled in the art to better understand the solutions of the present disclosure, the technical solutions in the embodiments of the present disclosure will be clearly and completely described below in combination with the drawings in the embodiments of the present disclosure. It is apparent that the described embodiments are only part of the embodiments of the present disclosure, not all the embodiments. Based on the embodiments in the present disclosure, all other embodiments obtained by those of ordinary skill in the art without creative work shall all fall within the protection scope of the present disclosure.

It is to be noted that terms "first", "second" and the like in the description, claims and the above-mentioned drawings of the present disclosure are used for distinguishing similar objects rather than describing a specific sequence or a precedence order. It should be understood that the data used in such a way may be exchanged where appropriate, in order that the embodiments of the present disclosure described here can be implemented in an order other than those illustrated or described herein. In addition, terms "include" and "have" and any variations thereof are intended to cover non-exclusive inclusions. For example, it is not limited for processes, methods, systems, products, or devices containing a series of steps or units to clearly list those steps or units, and other steps or units which are not clearly listed or are inherent to these processes, methods, products or devices may be included instead.

The method embodiments provided in the embodiments of the present disclosure may be executed in a computer terminal or a similar computing apparatus. For example, the method embodiments are operated on the computer terminal, FIG. 1 is a block diagram of a hardware structure of a computer terminal of a method for publishing an RT-5G routing message according to an embodiment of the present disclosure. As shown in FIG. 1, the computer terminal may include one or more (there is only one shown in FIG. 1) processors 102 (the processors 102 may include, but are not limited to, a Microprocessor Unit (MCU) or a Programmable Logic Device (PLD) and a memory 104 configured to store data. In an exemplary embodiment, the computer terminal may further include a transmission device 106 configured to achieve a communication function and an input/output device 108. Those skilled in the art may understand that the structure shown in FIG. 1 is only a schematic diagram, which does not limit the structure of the above computer terminal. For example, the computer terminal may further include components than those shown in FIG. 1, or have different configurations that are equivalent or more functional than those shown in FIG. 1.

The memory 104 may be configured to store a computer program, for example, a software program and a module of application software, such as a computer program corresponding to a method for publishing an RT-5G routing message in the embodiments of the present disclosure. The processor 102 runs the computer program stored in the memory 104, so as to execute various functional applications and data processing, that is, to realize the above method. The memory 104 may include a high-speed random access memory, and may further include a non-volatile memory, such as one or more magnetic disk memory apparatuses, a flash memory device, or other non-volatile solid-state memory devices. In some examples, the memory 104 may further include memories remotely disposed relative to the processor 102. The remote memories may be connected to the computer terminal by using a network. Examples of the above network include, but are not limited to, the Internet, an intranet, a local area network, a mobile communication network, and a combination thereof.

The transmission apparatus 106 is configured to receive or send data via the network. The specific example of the above network may include a wireless network provided by a communication provider of the computer terminal. In an example, the transmission apparatus 106 includes a Network Interface Controller (NIC), and may be connected to other network devices by using a base station, so as to communicate with the Internet. In an example, the transmission apparatus 106 is a Radio Frequency (RF) module, which is configured to communicate with the Internet in a wireless manner.

It is to be noted that, the computer terminal executing the method for publishing an RT-5G routing message may also execute an RT-5E routing message publishing method, and details are not described again in the present disclosure.

It is to be noted that, an RT-5G routing message is an RT-5 routing message in which a GW-IP is not 0; and an RT-5E routing message is an RT-5 routing message in which an ESI is not 0. In some embodiments, the RT-5 routing message may be a fifth-type EVPN routing message, which is an EVPN IP prefix routing message. The GW-IP field and the ESI field both are different types of Overlay Indexes for an RT-5 route.

Partial terms in the embodiments of the present disclosure are described below.

In the Section 3.2 of "draft-ietf-bess-evpn-prefix-advertisement", the GW-IP is defined as an RT-5 route (RT-5G route) of the Overlay Index; since the definition of the RT-5G route is ambiguous in the book, some devices in a network only support to analyze the GW-IP of the RT-5G route into another RT-2 route, but not support to analyze the GW-IP of the RT-5G route into other types of routes (for example, another RT-5 route). For ease of description, such node may be called a functionally-limited RT-5G node. In the related art, low-end devices, such as a TOR in a DC network, are more likely to be the functionally-limited RT-5G node (which may be simply called a limited node).

FIG. 2 is a flowchart of a method for publishing an RT-5G routing message according to an embodiment of the present disclosure. As shown in FIG. 2, the method includes the following step.

At S202, a first device publishes an RT-5G routing message for a CE-Prefix to enable a low-end RT-5 node to receive the RT-5G routing message. A GW-IP field of the RT-5G routing message carries a first IP; a next hop of Overlay of the CE-Prefix is a second IP, and the second IP is allowed to be reached by means of a node to which the first IP belongs; the RT-5G routing message is configured to instruct the low-end RT-5 node to analyze the GW-IP field carried in the RT-5G routing message into an RT-2 route; and the second IP is not in a directly-connected subnet of an EVPN.

It is to be noted that, the second IP is not in the directly-connected subnet of the EVPN on the first device.

It is to be noted that, when a PE node P announces, to another PE node Q, an RT-5G route in which an IP prefix matches $IP_x$ and the GW-IP is $IP_y$, from the point of view of the node Q, it may be considered that the node P announces, to the node Q, the route indicating that the $IP_x$ may be reached via the $IP_y$.

It is to be noted that, the low-end RT-5 node may be understood as a limited RT-5G node, and includes a functionally-limited RT-5G node and a performance-limited RT-5G node. The low-end RT-5 node in some embodiments of the present disclosure is the performance-limited RT-5G node. The performance-limited RT-5G node may analyze the GW-IP of the RT-5G route into a non-RT-2 route, but the performance when N+1 routing iterations are required is lower than the performance when only N routing iterations are required.

In an embodiment, when the GW-IP field of the RT-5G routing message carries the first IP, the RT-5G routing message is further configured to indicate a data message that is forwarded to the CE-Prefix by the low-end RT-5 node according to forward information in the RT-2 route.

In an embodiment, before the first device publishes the RT-5G routing message for the CE-Prefix to enable the low-end RT-5 node to receive the RT-5G routing message, an embodiment of the present disclosure further provides the following technical solution. The method includes: determining whether the first device receives the RT-2 route corresponding to the first IP; if so, carrying the first IP in the GW-IP field of the RT-5G routing message; and if no, carrying the second IP in the GW-IP field of the RT-5G routing message.

In an embodiment, before the first device publishes the RT-5G routing message for the CE-Prefix to enable the low-end RT-5 node to receive the RT-5G routing message, when a second condition is met, the first IP is carried in the GW-IP field of the RT-5G routing message. The second condition includes: a node to which a third IP belongs being able to be reached via the first IP, the second IP being able to be reached via the third IP, and there being no Overlay Index in the route corresponding to the first IP or the Overlay Index being not an IP address.

In an embodiment, the first IP corresponds to a first set. The first set consists of Provider Edge (PE) nodes; the PE nodes in the first set all announce routes indicating that the second IP is allowed to be reached via the first IP; other PE nodes do not announce, in the EVPN, routes indicating that the second IP is allowed to be reached via other private IPs; and other PE nodes are nodes in the EVPN other than the PE nodes in the first set.

It is to be noted that, when a PE node A announces a route indicating that the first IP may be reached via a Yth ESI, another PE node B announces a route indicating that the second IP may be reached via the first IP, and still another PE node C announces a route indicating that an Xth ESI may be reached via the route, it may also be considered that the PE node C announces the route indicating that the second IP may be reached via the first IP. A, B, and C may be considered as the same node, or any two of A, B, and C may be the same node, or A, B, and C may be different nodes.

In an embodiment, the first IP corresponds to a second set. The second set consists of PE nodes; the PE nodes in the second set all announce routes indicating that the second IP is allowed to be reached via the first IP; and for a target PE node in other PE nodes, if the target PE node announces, in the EVPN, routes indicating that the second IP may be reached via an Xth IP, and the number of all PE nodes in the EVPN that announce the routes indicating that the second IP may be reached via the Xth IP is less than the number of the PE nodes of the second set; and it is determined that the IP (i.e. the first IP) corresponding to the second set is carried in the GW-IP field of the RT-5G routing message.

By means of the above step, according to the method of the present disclosure, the first device publishes the RT-5G routing message for the CE-Prefix to enable the low-end RT-5 node to receive the RT-5G routing message; the GW-IP field of the RT-5G routing message carries the first IP; the next hop of Overlay of the CE-Prefix is the second IP, and the second IP is allowed to be reached by means of the node to which the first IP belongs; and the RT-5G routing message is configured to instruct the low-end RT-5 node to analyze the GW-IP field carried in the RT-5G routing message into the RT-2 route. Compared with the prior art, by means of using a mechanism of replacing the value of the GW-IP in the RT-5G route, the problem that a routing sender announces the RT-5G route to a receiving end for the CE-Prefix of a CE when the low-end RT-5 node as the receiving end is not updated is solved, i.e., the problem that a limited node cannot be forwarded to a data message of the CE-Prefix according to the RT-5G route. Furthermore, the RT-5G route does not cause the corresponding data message to bypass via a GW (the CE is not adjacent to the GW).

In addition, an RT-5G route publishing mechanism in the present disclosure may be used in any EVPN, especially in a DC network, and is a general technical solution. On the basis of the RT-5G route publishing mechanism, when there is the low-end RT-5 node in a DC, a DGW can also publish the RT-5G route for the CE-Prefix.

FIG. 3 is a flowchart of a method for publishing an RT-5 routing message according to an embodiment of the present disclosure. As shown in FIG. 3, the method includes the following step.

At S302, a first device publishes an RT-5 routing message for a CE-Prefix to enable a low-end RT-5 node to receive the RT-5 routing message. An ESI field of the RT-5 routing message carries a first ESI; a next hop of Overlay of the CE-Prefix is a second IP, and the second IP is allowed to be reached by means of a node to which the first ESI belongs; and the RT-5 routing message is configured to instruct the low-end RT-5 node to analyze the ESI field carried in the RT-5 routing message into an RT-1 route.

By means of the above step, the first device publishes the RT-5 routing message for the CE-Prefix to enable the low-end RT-5 node to receive the RT-5 routing message; the ESI field of the RT-5 routing message carries the first ESI; the next hop of Overlay of the CE-Prefix is the second IP, and the second IP is allowed to be reached by means of the node to which the first ESI belongs; and the RT-5 routing message is configured to instruct the low-end RT-5 node to analyze the ESI field carried in the RT-5 routing message into the RT-1 route. In this way, the problem of docking with the low-end RT-5 node is solved.

This embodiment of the present disclosure and the embodiment in FIG. 2 both are intended to solve the problem of docking with the low-end RT-5 node. The embodiment in FIG. 2 solves the problem of docking with the low-end RT-5 node by converting complex RT-5G into simple RT-5G; and this embodiment of the present disclosure solves the problem of docking with the low-end RT-5 node by converting the RT-5G into RT-5E.

It is to be noted that, the first Ethernet tag identifier field may be an Ethernet Tag ID.

It is to be noted that, the RT-5G route is also the RT-5 route. The technical solution in this embodiment of the present disclosure may be suitable for the RT-5G route and the RT-5E route. The RT-5 route in which the ESI is not 0 is the RT-5E; and the RT-5 in which the GW-IP is not 0 is the RT-5 G.

In an embodiment, the first ESI is an ESI that needs to be passed through to reach first Media Access Control (MAC), and an RT-5 route simultaneously carries a first route target, the first MAC, and a first identifier. The first MAC is MAC corresponding to a fourth IP, the fourth IP is an IP in a first Broadcast Domain (BD), and the fourth IP is the second IP or the second IP may be reached via the fourth IP; the first route target is an export Route Target (eRT) of an IP-Virtual Routing Forwarding (VRF) instance to which the CE-Prefix belongs, and the first BD is a BD corresponding to a directly-connected subnet on the first device; the first identifier is an identifier of the first BD; the first MAC is configured to instruct the third device to take the first MAC as destination MAC when a data packet is sent to the first device according to the RT-5 route; and the first ESI and the first identifier are configured to instruct the third device to determine the RT-1 route according to the first ESI and the first identifier when the data packet is sent to the first device according to the RT-5 route. The first device publishes a third route. The third route is the RT-1 route, and an ESI of the third route is the first ESI; a first Ethernet tag identifier field is the first identifier; the third route and/or the RT-5 route also carries second MAC; and the second MAC is configured to instruct the third device to take the second MAC as source MAC when the data packet is sent to the first device according to the third route.

In an embodiment, the RT-5 route and/or the RT-1 route also carries a first indicator. The first indicator is configured to instruct the third device to package the source MAC and the destination MAC when the data packet is sent to the first device according to the RT-5 route.

In an embodiment, the third route also carries a first route target, and there is no first BD on the third device, and a first IP-VRF instance on the third device does not import an eRT of the first BD. The first IP-VRF instance is the IP-VRF instance that imports the RT-5 route. The third route does not carry the eRT of the first BD.

In an embodiment, the first ESI is an ESI corresponding to the IP-VRF instance to which the RT-5 route; a first Ethernet tag identifier field of the RT-5 route is the second IP, and the first Ethernet tag identifier field of the RT-1 route is the second IP; and an ESI field of the RT-1 route is the first ESI.

In an embodiment, the method further includes: receiving a first RT-5E route by the first device, and when at least one of a third condition, a fourth condition, or a fifth condition is met, performing localization for the first RT-5E route. The first RT-5E route is an RT-5E route published by the third device; the third condition is that a first node set, a second node set, and a third node set meet a sixth condition; the fourth condition is that the first MAC carried in the first RT-5E route is MAC in a BD to which a fourth Access Controller (AC) belongs or the second MAC carried in the first RT-5E route is an MAC of an IRB interface corresponding to the BD to which a fourth AC belongs; the fifth condition is that the first RT-5E route carries the first indicator; localization is to take the fourth AC as a forwarding outbound interface of the first RT-5E route; the first node set is a node set having a first tuple, the second node set is a node set having a second tuple, and the third node set is a node set having a third tuple; the sixth condition is that an intersection between the first node set and the second node set is not null and an intersection between the third node set and the second node set is not null; the fourth AC is an AC on the first device; the BD corresponds to a local subnet in a tenth IP-VRF instance that imports the first RT-5E route; the first tuple is <ESI, Ethernet Tag ID> to which the fourth AC belongs; the second tuple is <ESI, Ethernet Tag ID> in an EVPN; the third tuple is <an ESI of the RT-5E route, a first Ethernet tag identifier field of the first RT-5E route>; and the first tuple, the second tuple, and the third tuple are able to be completely or partially the same.

In an embodiment, the first device publishes a second routing message. The second routing message is an RT-1 routing message, an ESI of the second routing message is the first ESI, and a first Ethernet tag identifier field of the second routing message is the second IP.

In an embodiment, when each node T receives a route indicating that the second IP may be reached by means of the node T, and when each node K receives the RT-1 route, the RT-5 route is published, otherwise, the GW-IP is still published as the RT-5G route of the second IP. Each node T publishes the RT-1 route to the first device; each node K publishes, to the first device, a route that may reach the second IP by means of the node K; and an ESI in the RT-1 route is the ESI and the first Ethernet tag identifier field is the second IP.

In an embodiment, the first device performs, according to the RT-1 route corresponding to <first ESI, first Ethernet tag identifier field> being <first ESI, first Ethernet tag identifier field>, Designated Forwarder (DF) election affected by an AC.

It is to be noted that, in this embodiment of the present disclosure, the first device performs, according to the RT-1 route published for the <first ESI, first Ethernet tag identifier field> by the third device being the <first ESI, first Ethernet tag identifier field>, DF election affected by the AC. Devices participating in the election are not limited in this embodiment. For example, the devices participating in the election may be the RT-1 route published by the third device, or other devices.

It is to be noted that, the RT-1 route is published for the <first ESI, first Ethernet tag identifier field> by the third device.

In an embodiment, the third device performs, according to the RT1 route being the <ESI, first Ethernet tag identifier field>, DF election affected by the AC.

In an embodiment, before the second routing message is published, the method further includes: instructing the first device to publish the second routing message.

It is to be noted that, the second routing message in this embodiment of the present disclosure may be understood as the RT-1 route published by the first device, or another route that has the ESI field and the first Ethernet tag identifier field, which are the same as the second routing message.

In an embodiment, before the RT-5 route is published, the method further includes: instructing the first device to publish the RT-5 route.

In an embodiment, the RT-1 route is updated to enable the updated RT-1 route to carry a Primary/Backup attribute that is set according to a DF election result.

In an embodiment, when the ESI field of the RT-5 routing message carries the first ESI, the RT-5 routing message is further configured to indicate a data message that is forwarded to the CE-Prefix by the low-end RT-5 node according to forward information in the RT-1 route.

In an embodiment, an embodiment of the present disclosure further provides a technical solution before the first device publishes the RT-5 routing message for the CE-Prefix to enable the low-end RT-5 node to receive the RT-5 routing message. The method specifically includes: determining whether the first device receives the RT-1 route corresponding to the first ESI; if so, carrying the first ESI in the ESI field of the RT-5 routing message; and if no, carrying the second IP in the GW-IP field of the RT-5G routing message.

Next, the method for publishing an RT-5G routing message and the method for publishing an RT-5 routing message in the present disclosure are described with reference to the following embodiments.

Embodiment 1

FIG. 4 is a schematic diagram of an RT-5G route iteration process for a TOR proxy by means of a DGW according to an embodiment of the present disclosure. As shown in FIG. 4, PE1, PE2, DGW1, and R1 form a DC network. The R1 is a CE device; the PE2 is the low-end RT-5 node; the PE1 is a non-low-end RT-5 node. The CE accesses the PE1 by means of a physical port P1 (not shown in FIG. 1), and assesses the PE2 by means of a physical port P2 (not shown in FIG. 1). The P1 and the P2 are aggregated on the CE to form a Link Aggregation Group (LAG), and a virtual interface of the LAG is SG21 (not shown in FIG. 1). The CE communicates with an IP-VRF instance IPVRF1 on the PE1/PE2 by means of a subnet 10.0.0.0/24. A CE-side IP address is 10.0.0.2 (i.e., 10.2 in the figure). On a sub-interface SG21.1 (not shown in FIG. 1), PE1 and PE2-side IP addresses are 10.0.0.9 (which are 10.9 in the figure), and are respectively on sub-interfaces P1.1 and P2.1. The SG21.1 is a sub-interface of an SG21 interface, the P1.1 is a sub-interface of a P1 interface, the P2.1 is a sub-interface of a P2 interface, and P1 and P2 are bound to an ESI21. A Loopback interface address of the R1 is 1.1.1.1; a Loopback interface address of the DGW1 is 3.3.3.3, and 3.3.3.3 is in the IPVRF1; and a CE-BGP session is established between the R1 and the DGW1 (i.e., the DGW1 in the figure) by means of 1.1.1.1 and 3.3.3.3. Then, the following steps are executed.

At S1, a static route S1 is configured for 1.1.1.0/24 on the PE1; the S1 is in the IPVRF1; and a private network next hop is 10.0.0.2 (i.e., 10.2 in the figure).

At S2, an Address Resolution Protocol (ARP) entry of 10.0.0.2 is learned on the PE1.

At S3, the PE1 publishes an RT2 route X0 for the ARP entry; an IP of the X0 is 10.0.0.2; an ESI is the ESI21 in FIG. 1; an MPLS Label2 field of the X0 is filled in with an EVPN tag of the IPVRF1; an RT is filled in with an eRT of the IPVRF1; and an MPLS Label1 field is filled in with a pre-configured tag.

At S4, an RT-5G route X1 is published for 1.1.1.0/24 on the PE1, and the GW-IP is 10.0.0.2.

At S5, the DGW1 (i.e., the first device) learns an IP prefix CE_Prefiex1 (i.e., 9.9.9.0/24) behind the R1 by means of the BGP session, and a private network next hop of the CE_Prefix1 is 1.1.1.1.

At S6, the DGW1 receives the RT-5G route X1 from the PE1, an IP prefix of the X1 is 1.1.1.0/24, and the GW-IP is 10.0.0.2.

At S7, the DGW1 may learn, according to the X1, that a node to which 1.1.1.1 (i.e., the second IP) may be reached via a node where 10.0.0.2 (i.e. the first IP) is located, and 1.1.1.1 is an Overlay next hop of the CE_Prefix1 (i.e. the first route), such that the DGW1 publishes an RT-5G routing message X2 (i.e. the first routing message) for the CE_Prefix1, and the GW-IP is 10.0.0.2.

At S8, the PE2 receives the X0, and an ARP entry is formed in a local 10.0.0/24 network segment (which may be obtained by matching 10.0.0.2 in the X0) of the IPVRF1 (which may be obtained by means of a route target or ESI23 matching).

At S9, the PE2 receives the X2, such that the GW-IP of the X2 is analyzed into an RT-2 route (i.e., the RT-2 route X0 sent by the PE1), the PE2 adds the CE Prefix in the X2 message to an EVPN route table, so as to form a route table entry RE2, and a private network next hop of the RE2 is the value (i.e. 10.0.0.2) of the GW-IP.

At S10, the PE1 receives the X2, such that the GW-IP of the X2 is analyzed into a local directly-connected network segment 10.0.0.0/24, then the CE Prefix in the X2 message is added to the EVPN route table, so as to form a route table entry RE1, and a private network next hop of the RE1 is the value (i.e., 10.0.0.2) of the GW-IP. It is to be noted that, the PE1 is not the low-end RT-5 node, such that the GW-IP of the X2 does not need to be analyzed into the RT-2 route.

At S11, the PE2 node receives, in the IPVRF1, a data message DP9 that is sent to a host 9.9.9.1 in the CE_Prefix1 by a router R2; the route table entry RE2 is hit according to a destination IP of the message; a next hop IP being 10.0.0.2 is obtained according to the RE2; an interface AC2 to which 10.0.0.1 belongs is matched according to the next hop IP; an ARP table entry corresponding to 10.0.0.2 is checked on an AC2 to encapsulate an Ethernet header for the DP9, and the DP9 is sent from the AC2.

It is to be noted that, a next hop of the RT-2 route X0 published by the PE1 is a VXLAN Tunnel Endpoint (VTEP) address (for example, 100.1.1.1) of the PE1. For ease of description, a PE node address of the PE1 (or the TOR1) is recorded as VTEP_IP1; a PE node address of the PE2 (or the TOR2) is recorded as VTEP_IP2; a PE node address of a TOR3 is recorded as VTEP_IP3; and a PE node address of the DGW1 is recorded as VTEP_IP4. Therefore, the 100.1.1.1 is a value of the VTEP_IP1 in this example.

It is to be noted that, although the PE2 node forwards the DP9 according to an RT-5G route X2 of the DGW1, the DP9 does not bypass via the DGW1.

By means of the above steps, an RT-5G route iteration process for a TOR (for example, the PE1 and the PE2) proxy is realized by means of the DGW (for example, the DGW1), such that the TOR is prevented from being requested to support complex RT-5G route iteration, thereby improving the forwarding efficiency on the TOR. In addition, a TOR device has a wider selection range, facilitating reduction of network creation cost.

Embodiment 2

This embodiment is the same as Embodiment 1 except where otherwise noted.

The following are particular special instructions.

First, different from Embodiment 1, the value of an MPLS Label2 field in an X0 route published by the PE1 is an EVPN tag of the IPVRF1; after the PE2 receives the X0 route, an FIB table entry RE3 is formed, and the prefix of the RE3 is 10.0.0.2/32; an outbound EVPN tag is a tag indicated by the MPLS Label2 field; and tunnel encapsulation information to the PE1 is saved in the RE3.

Second, different from Embodiment 1, when the PE2 node receives, in the IPVRF1, the data message DP9 that is sent to the host 9.9.9.1 in the CE_Prefix1 by the router R2, the route table entry RE3 is hit according to the destination IP of the data message DP9; the EVPN tag and tunnel information of the PE1 are obtained according to the RE3; and an outer-layer tunnel encapsulation is added to the DP9 according to the EVPN tag and the tunnel information, and then the DP9 is forwarded to the IPVRF1 of the PE1.

Third, different from Embodiment 1, the PE1 node receives the data message DP9 in the IPVRF1; a route table entry RE1 is hit according to the destination IP of the data message DP9; the next hop IP being 10.0.0.2 is obtained according to the RE1; an interface AC1 to which 10.0.0.1 belongs is matched according to the next hop IP, such that a forwarding outlet is learned as the AC1; and the ARP table entry corresponding to 10.0.0.2 is checked on the AC1 to encapsulate an Ethernet header for the DP9, and the DP9 is forwarded out from the AC1.

Embodiment 3

An embodiment of the present disclosure provides a method for publishing an RT-5E route to a low-end RT-5 node. The method is applied to a first device. Specific technical solutions are as follows.

The first device publishes a first routing message (i.e., an RT-5E route) for first routing information (i.e., a CE-Prefix, prefix information behind a CE) that meets a first condition (that is, "a private network next hop is not a first ESI but a private network next hop IP may be reached by means of a node to which the first ESI belongs"). An ESI field of the first routing message carries the first ESI. An Overlay next hop of the CE-Prefix is a second IP; the first condition is that the second IP may be reached by means of the node to which the first ESI belongs; the first routing message is configured to indicate a data message that is forwarded to the CE-Prefix by a second device according to forward information in an RT-1 route corresponding to the first ESI.

In an embodiment, when receiving the RT-1 route corresponding to the first ESI, the first device can set the ESI field to the first ESI, otherwise, a GW-IP field (note: the GW-IP field and the ESI field may not both be non-zero values at the same time) is still be set to the second IP.

In an embodiment, the second device is a low-end RT-5 node.

It is to be noted that, when the low-end RT-5 node is a functionally-limited RT-5 node, by converting an original RT-5G route into the RT-5E route, the functionally-limited RT-5 node is prevented from being unable to forward the data message of the CE-Prefix due to inability to correctly process the original RT-5G route.

It is to be noted that, by publishing the RT-5E route to the second device without publishing the RT-5G route to the second device, the probability of abnormal message forwarding because the RT-5G route cannot be correctly iterated by the second device is reduced, such that the efficiency of message forwarding is improved.

The plurality of embodiment above are based on the same technical ideas. The problem of docking with the low-end RT-5 node is solved by means of technical point of view of respectively converting complex RT-5G into simple RT-5G and converting the RT-5G into the RT-5E, thereby improving the efficiency of message forwarding.

Embodiment 4

Figure 5:
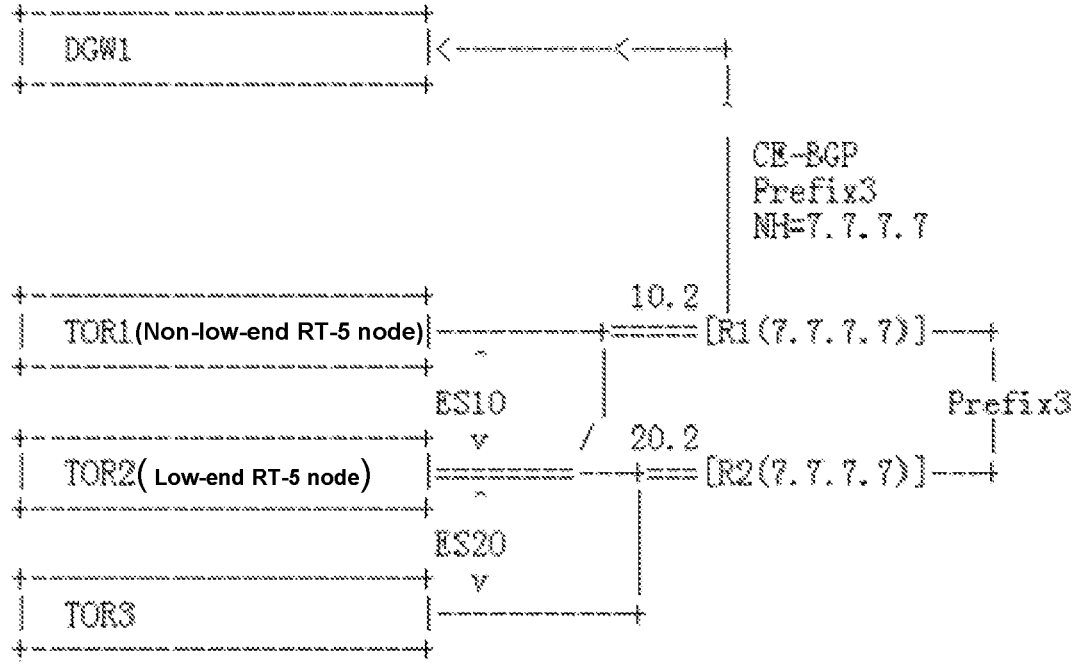
FIG. 5 is a schematic diagram of a GW-IP of publishing RT-5G by selecting an optimal proxy according to an embodiment of the present disclosure.

FIG. 5 is a schematic diagram of a GW-IP of publishing RT-5G by selecting an optimal proxy according to an embodiment of the present disclosure. As shown in FIG. 5, a TOR1 (equivalent to the PE1 in FIG. 4, i.e. a non-low-end RT-5 node), a TOR2 (equivalent to the PE2 in FIG. 4, i.e. a low-end RT-5 node), and a TOR3 are another nodes having the same function as the PE1/PE2. R2 is a node having the same function as R1. The R1 (and a 10.0.0.0/24 subnet) is disposed on an Ether segment ES10, and the R2 (and a 20.0.0.0/24 subnet) is disposed on an Ether segment ES20. A GW address of the R1 is 10.0.0.9; a GW address of the R2 is 20.0.0.9; and the GW addresses of the R1 and the R2 are both on a TOR node. A Prefix3 is an IP prefix not only behind the R1 but also behind the R2. In addition, 7.7.7.7 is a common IP address (equivalent to the fact that the 7.7.7.7 is an Anycast address) of the R1 and the R2. Next, the following steps are executed below.

At S401, a static route S21 is configured for 7.7.7.0/24 on the TOR1, the S21 is in an IPVRF1, and a private network next hop is 10.0.0.2 (i.e. 10.2 in the figure); a static route S22 is configured for the 7.7.7.0/24 on the TOR2, the S22 is in the IPVRF1, and the private network next hop is 10.0.0.2 and 20.0.0.2 (i.e. 20.2 in the figure); and a static route S23 is configured for the 7.7.7.0/24 on the TOR3, the S23 is in the IPVRF1, and the private network next hop is 20.0.0.2.

At S402, an ARP entry of the 10.0.0.2 is learned on the PE1; and an ARP entry of the 20.0.0.2 is learned on the PE3.

At S403, the PE1 publishes an RT2 route X0a for the ARP entry; an IP of the X0a is the 10.0.0.2; an ESI is an ESI21; an MPLS Label2 field of the X0a is filled in with an EVPN tag of the IPVRF1; an RT is filled in with an eRT of the IPVRF1; and an MPLS Label1 field is filled in with a pre-configured tag.

At S404, the PE3 publishes an RT2 route X0c for the ARP entry; an IP of the X0c is the 20.0.0.2; an ESI is an ESI22; an MPLS Label2 field of the X0c is filled in with the EVPN tag of the IPVRF1; the RT is filled in with the eRT of the IPVRF1; and an MPLS Label1 field is filled in with a pre-configured tag.

At S405, an RT-5G route X1*a* is published for the 7.7.7.0/24 on the PE1, and a GW-IP is the 10.0.0.2; an RT-5G route X1*b* is published for the 7.7.7.0/24 on the PE2, and the GW-IP is the 10.0.0.2 or the 20.0.0.2; and an RT-5G route X1*c* is published for the 7.7.7.0/24 on the PE3, and the GW-IP is the 20.0.0.2.

At S406, the PE1 publishes an RT-1 per EVI route ET1 for the ESI21; the PE2 publishes an RT-1 per EVI route ET2 for the ESI21, and at the same time, publishes an RT-1 per EVI route ET3 for the ESI22; and the PE3 publishes an RT-1 per EVI route ET4 for the ESI22.

At S407, a DGW1 learns an IP prefix CE Prefix3 (i.e., 8.8.8.0/24) behind the R1 by means of a BGP session, and a private network next hop (i.e. the Overlay next hop) of the CE_Prefix3 is 7.7.7.7.

At S408, the DGW1 receives an RT-5 route X1*a* from the PE1, an IP prefix of the X1*a* is the 7.7.7.0/24, and the GW-IP is the 10.0.0.2; the DGW1 receives an RT-5 route X1*b* from the PE2, an IP prefix of the X1*b* is the 7.7.7.0/24, and the GW-IP is the 10.0.0.2 or 20.0.0.2; and the DGW1 receives an RT-5 route X1*c* from the PE3, an IP prefix of the X1*c* is the 7.7.7.0/24, and the GW-IP is the 20.0.0.2.

At S409, the DGW1 may learn, according to the X1*a*, the X1*b*, and the X1*c*, that different PEs each considers that a node to which the 7.7.7.7 (i.e. the second IP) may be reached via a node where at least one of the 10.0.0.2 (i.e. the first IP) or 20.0.0.2, and the 7.7.7.7 is the Overlay next hop of the CE_Prefix3 (i.e. a first route), such that the DGW1 publishes an RT-5G routing message X2*b* (i.e. a first routing message) for the CE_Prefix3, and the GW-IP is the 7.7.7.7, not the 10.0.0.2 or the 20.0.0.2. That is to say, the DGW1 no longer act as a proxy for the PE1/PE2/PE3 to perform a routing iteration process. The DGW1 makes this decision based on the following. The DGW1 may divide PE nodes in a network into three sets, which are a first set, a second set, and a set consisting of other PE nodes, by combining the X1*a*, the X1*b*, the X1*c*, the ET1, the ET2, the ET3, and the ET4. The PEs (i.e., the PE1 and the PE2) in the first set indicate the 7.7.7.7 may be reached via the 10.0.0.2, and the PEs (i.e. the PE2 and the PE3) in the second set indicate the 7.7.7.7 may be reached via the 20.0.0.2; and only when the first set is a subset of the second set or the second set is a subset of a first set, the DGW1 executes the proxy routing iteration process for the Prefix3.

It is to be noted that, assuming the proxy is performed at the moment, for example, the 20.0.0.2 corresponding to the second set is selected as the GW-IP to publish the RT-5G route, and the data message to the CE_Prefix3 only performs load sharing between the PE2 and the PE3. However, actually, the PE1 also has the capability of forwarding for the CE_Prefix3, such that the current proxy causes the CE_Prefix3 to loss a load sharing path. In some cases, especially when there is no functionally-limited node in the network, some personnel may consider that no proxy is a better option. In this embodiment, the problem that partial protective paths (for example, the load sharing paths) cannot be used for forwarding because of proxy RT-5G routing iteration in the networks of these personnel is avoided.

At S410, the R1 is also connected to the TOR3 by means of the ES10.

By means of the above steps, the TOR1, the TOR2, and the TOR3 all publish RT-1 per EVI routes for the ESI21. Therefore, in the view of the DGW1 node, the first set (which is the set consisting of the PE nodes indicating that the second IP may be reached via the 10.0.0.2) includes {PE1, PE2, PE3}, the second set includes {PE2, PE3}, and the second set is the subset of the first set, such that the DGW1 performs the proxy routing iteration process for the Prefix3, and the iterated GW-IP selects an IP (i.e. the 10.0.0.2, and the first IP) corresponding to the largest one (i.e. the first set) in the two sets as the GW-IP.

It is to be noted that, a PE set of each candidate GW-IP is found, and the set that can serve as a superset of all other sets is found; and then the candidate GW-IP corresponding to the set is used as the optimal GW-IP, and encapsulated in a finally-sent RT-5G route. In this embodiment, by finding the GW-IP with the best reachability as the GW-IP of the finally-sent RT-5G route, the problem that partial protective paths cannot be used for forwarding due to a proxy function of RT-5G routing iteration caused by misconfiguration of a user is further avoided, and the risks of an incomplete network protection function caused by the proxy function of RT-5G routing iteration due to incorrect use of the user are reduced. When the set that may be used as the superset of all other sets is not found, it is considered that there is no optimal set, that is to say, different sets are complementary in advantage (for example, each selects a portion of a protective forwarding path). In this case, a set including the highest number of PEs is barely selected as a suboptimal set. In a network having no functionally-limited RT-5 node, some personnel may consider that it is better not to act as a proxy (the selection of the forwarding path between comprehensive performance and routing performance is based on different policies, each with its own gains and losses, and all of them are rationalized). However, if the functionally-limited RT-5 node is indeed in the network, proxying with the suboptimal set is better than not proxying.

If there is the low-end RT-5 node, proxying with the suboptimal set is not as good as not proxying for some management policies. If there is a functionally-limited RT-5 node, proxying with the suboptimal set is better than not proxying, because not proxying means that the forwarding path is not available, and proxying with the suboptimal set may only cause the portion of the forwarding paths without protection to be not available. That is to say, if no nodes are functionally-limited nodes, proxying is not required; and when partial nodes are the functionally-limited nodes, proxying is performed with the suboptimal set.

It is to be noted that, in some embodiments, by uniformly allowing proxying with the suboptimal set, a network administrator may not need to learn which nodes in the network are the functionally-limited nodes, and may also not need to perform target management activities on the network for determining which nodes may close suboptimal set proxying, such that the burdens of the network administrator are alleviated, and the risks of abnormal message forwarding caused by improperly closing of a suboptimal set proxying function are reduced.

It is to be noted that, in some embodiments, in the case of not proxying, it means that an original next hop of the CE-Prefix is used as the GW-IP to publish the corresponding RT-5G routing message for the CE-Prefix. In some embodiments, the proxying means that the RT-5 route is published according to information obtained through iteration of the original next hop, and in this case, what published may be the RT-5G route or other route (for example, the RT-5E route). If it is the RT-5G route, the GW-IP is no longer the original next hop, but an IP address which is processed more easily for a receiving end of the RT-5G route, such that the processing burdens of the receiving end are alleviated, thereby improving the processing efficiency of the receiving end. The CE-Prefix is the IP prefix behind the CE. The IP prefix behind the CE is the IP prefix of an IP address that may be reached via the CE node from the PE node.

It is to be noted that, when all the low-end RT-5 nodes in the network are not the functionally-limited RT-5 nodes, a function is not affected without proxying, and the performance can be improved if proxying succeeds. Through proper configurations, when a proxying condition is met, the processing performance of the low-end RT-5 node is improved due to such proxying behavior of the first device. In particular, when there are a portion of the functionally-limited RT-5 nodes in the network, the proxying condition is sure to be met, such that the portion of the functionally-limited nodes can be enable to forward data for the CE-Prefix, and the performance can also be improved when other nodes are enabled to process the route corresponding to the CE-Prefix.

It is to be noted that, in some implementations, by setting the value of a BGP next hop of an EVPN route (for example, the X1$a$) published by each PE node to be always a PE node address of the PE node, which EVPN routes being published by which PE nodes may be learned by receiving the nodes of the EVPN routes, such that whether proxying should be performed may be determined based on this. For example, the BGP next hop VTEP_IP1 of the X1$a$ is the PE node address of the PE1 node, such that the X1$a$ is published by the PE1 node.

By means of the above step, according to the method of the present disclosure, the first device publishes the RT-5G routing message for the CE-Prefix to enable the low-end RT-5 node to receive the RT-5G routing message; the GW-IP field of the RT-5G routing message carries the first IP; the next hop of Overlay of the CE-Prefix is the second IP, and the second IP is allowed to be reached by means of the node to which the first IP belongs; and the RT-5G routing message is configured to instruct the low-end RT-5 node to analyze the GW-IP field carried in the RT-5G routing message into the RT-2 route. Compared with the prior art, by means of using a mechanism of replacing the value of the GW-IP in the RT-5G route, the problem that a routing sender announces the RT-5G route to a receiving end for the CE-Prefix of a CE when the low-end RT-5 node as the receiving end is not updated is solved, i.e., the problem that a limited node cannot be forwarded to a data message of the CE-Prefix according to the RT-5G route. Furthermore, the RT-5G route does not cause the corresponding data message to bypass via a GW (the CE is not adjacent to the GW).

By means of the technical solutions provided in the above embodiments, a method for docking a DGW with the low-end RT-5 node is described, such that, without upgrading these low-end RT-5 nodes, scenarios that are supported only when "the nodes on the position where they are located (or the same role to which they belong)" support analysis of the RT-5G route into another RT-5 route are supported. Therefore, the problem that a docking range of the RT-5G route is too narrow is solved, and function of a complex EVPN are realized by using old devices, thereby reducing network maintenance costs, and prolonging the time for the TOR nodes to exit their original network roles.

Embodiment 5

This embodiment is the same as Embodiment 4 except where otherwise noted.

Special illustrations of this embodiment of the present disclosure are as follows.

First, different from Embodiment 4, in this embodiment, the R1 does not need to be connected to the TOR3.

Figure 6:
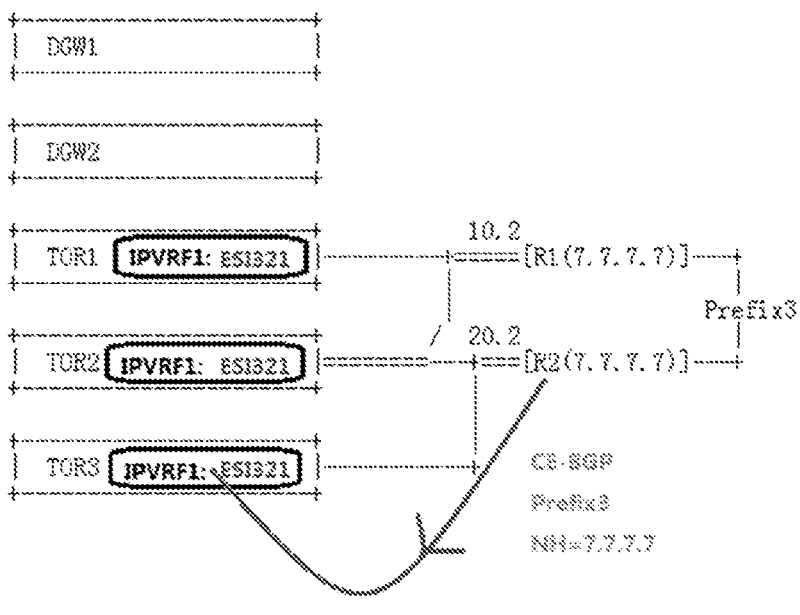
FIG. 6 is a schematic diagram of establishing a CE-Border Gateway Protocol (BGP) session according to an embodiment of the present disclosure.

Second, different from Embodiment 4, in this embodiment, the CE does not establish CE-BGP with the DGW, but establish the CE-BGP with some of the TOR nodes nearby. Without losing generality, in this embodiment, it is assumed that the R2 establishes a CE-BGP session S2003 with the TOR3. As shown in FIG. 6, FIG. 6 is a schematic diagram of establishing a CE-BGP session according to an embodiment of the present disclosure.

Third, different from Embodiment 4, in this embodiment, the following steps further need to be described with reference to FIG. 6.

At S7000, an ESI321 is bound for the IPVRF1 on the TOR1, the TOR2, and the TOR3, respectively.

At S7010, the RT-1 per EVI route is published for the 7.7.7.7 on the TOR1, the TOR2, and the TOR3, respectively; an ESI of the RT-1 per EVI route is the ESI321; and a first Ethernet tag identifier field of the RT-1 per EVI route has the same value (which is recorded as ETI7) as the 7.7.7.7.

It is to be noted that, in some implementations, the first Ethernet tag identifier field may be an Ethernet Tag ID field of the RT-1 route.

At S7040, an RT-1 per EVI route Y1$a$ is published for the 7.7.7.7 on the TOR1; an RT-1 per EVI route Y1$b$ is published for the 7.7.7.7 on the TOR2; and an RT-1 per EVI route Y1$c$ (i.e., a second route) is published for the 7.7.7.7 on the TOR3.

At S7090, the TOR3 learns an IP prefix CE_Prefix3 (i.e., 8.8.8.0/24) behind the R2 (also behind the R1) by means of the CE-BGP session S2003, and a private network next hop of the CE_Prefix3 is the 7.7.7.7.

At S7100, the TOR3 respectively receives the RT-1 routes Y1$a$ and Y1$b$ from the PE1 and the PE2.

At S7110, the TOR3 may learn, according to the Y1$a$, the Y1$b$, the Y1$c$, the X1$a$, the X1$b$, and the X1$c$, that the nodes to which the 7.7.7.7 (i.e. the second IP) belongs may be reached via the nodes where the ESI321 (i.e. the first ESI), and the 7.7.7.7 is the Overlay next hop of the CE_Prefix3 (i.e. the first route), such that the TOR3 publishes an RT-5G routing message Y2$c$5 (i.e. the first routing message) for the CE_Prefix3, the ESI is the ESI321, and an Ethernet Tag ID (ET-ID, i.e. the first Ethernet tag identifier field) has the same value (which is recorded as ETI7) as the 7.7.7.7.

It is to be noted that, in an embodiment, the TOR3 may learn that the second IP may be reached via the Ethernet Tag of the second IP with the value on the ES identified by the ESI321, or in short, the second IP may be reached via the first ESI.

At S7120, the TOR2 (the PE2) receives the RT-5E routing message Y2$c$5 and the RT-1 per EVI routing messages Y1$a$ and Y1$c$, such that the PE2 may forward a data message in which a destination IP is 8.8.8.0/24 to the TOR1 and the TOR3, as the ESI and ET-ID of the Y2$c$5 are the same as the ESIs and ET-IDs of the Y1$a$ and the Y1$c$.

It is to be noted that, since the TOR2 is the low-end RT-5 node, the TOR3 converts the route that is originally published by using the RT-5G routing message with the GW-IP being the 7.7.7.7 into the route published by using the RT-5E routing message, so as to simplify the processing on the TOR2. In addition, since all three TOR nodes publish the RT-1 per EVI route for the <ESI321, ETI7 (i.e., the 7.7.7.7)>, the TOR2 may perform protection or load sharing on the data message among the ACs of the three TOR nodes.

It is to be noted that, the corresponding RT-1 per EVI route is further configured to perform all-active ESI or Single-Active ESI forwarding on the PE node such as the DGW that is not adjacent to any one of the R1 and the R2; the corresponding RT-1 per EVI route is further configured to perform export link protection on the TOR that is adjacent to at least one node of the R1 or the R2; and the export link protection refers to the protection when the Overlay next hop (for example, the 7.7.7.7) of the CE_Prefix3 is not reachable.

It is to be noted that, if the TOR3 only receives the Y1b from the TOR2 but does not receive the X1b, or only receives the X1b but does not receive the Y1b, the TOR3 considers that the TOR2 is either not the node where the ESI321 is located, or is not the node where the 7.7.7.7 is located, or not is not properly configured as required for this embodiment, such that the TOR2 is not the node that can be determined to meet the condition that the node to which the 7.7.7.7 belongs may be reached via the node where the ES1321 is located, but also meet partial condition, thus the TOR2 may also be the node (which has the capability but is not properly configured) that may reach the 7.7.7.7. In this case, proxying may not be performed for the CE_Prefix3, and the RT-5G route with the GW-IP being the 7.7.7.7 still needs to be published, so as to cause other nodes to process the RT-5G route according to a plurality of original routing iteration processes.

As long as the RT-1 per EVI route (for example, the Y1a) with the ESI being the ESI321 that is published for the 7.7.7.7 (that is, the ET-ID is the 7.7.7.7) by any node and any private network route (for example, the X1a) with the 7.7.7.7 being the IP prefix that is published by the node are not received by the TOR3 at the same time, the TOR3 would not consider that the node recognizes that the 7.7.7.7 may be reached via the ESI321; and as long as it cannot be determined that any node recognizes that the 7.7.7.7 may be reached via the ESI321, the TOR3 would not consider that the RT-5E route with the ESI being the ES1321 and the ET-ID being the 7.7.7.7 may be sent for the CE-Prefix with the 7.7.7.7 being the private network next hop.

It is to be noted that, when there are a plurality of groups of CEs in IP-VRF, each group of CEs has a batch of CE-Prefixes, and each batch of CE-Prefixes has an address like the 7.7.7.7 as the second IP. For all these CE-Prefixes, in this embodiment, only one ESI (for example, the ESI321) needs to be configured, such that only one RT-1 per ES route needs to be published. Therefore, the problem of excessive published RT-1 per ES routes when the ESI is configured for each second IP is avoided, thereby reducing the burdens of the EVPN route in the network.

It is to be noted that, since all the second IPs of the same type in the same IP-VRF share the same ESI, in this embodiment, a DF is elected for each second IP by using a method of performing DF election affected by an AC, such that service carving is realized more easily, that is to say, the DFs of different second IPs are more easily to fall onto different PE nodes, and the problem that more configuration information is needed to cause the DFs of different second IPs to fall onto different PE nodes when an independent ESI is mapped for each second IP is solved.

Embodiment 6

This embodiment is the same as Embodiment 5 except where otherwise noted.

Special illustrations of this embodiment of the present disclosure are as follows.

First, different from Embodiment 5, in this embodiment, the R1 and the R2 are two components of the same Virtual Network Function (VNF); the VNF serves as a virtual router; the 7.7.7.7 is a BGP Router ID on the virtual router; and the R1 and the R2 are two Line Processing Units (LPUs) of the virtual router.

Second, different from Embodiment 5, in this embodiment, in S7090, the private network next hop of the CE_Prefix3 received by the TOR3 from the S2003 is IP612 instead of the 7.7.7.7; the CE_Prefix3 is an IPv6 prefix; the IP612 is an IPv6 address; and the IP612 is a common IP address on the R1 and the R2.

It is to be noted that, in order to distinguish this embodiment from the foregoing embodiments, the CE_Prefix3 is called the CE_Prefix3 hereafter.

Third, different from Embodiment 5, in this embodiment, in this embodiment, the following steps further need to be executed.

At S7104, the PE1 is instructed to publish (that is, publishing a route in which the IP prefix matches the IP612) an RT-5 Z1a for the IP612, and an auxiliary Overlay Index is the 7.7.7.7.

At S7105, the PE2 is instructed to publish an RT-5 Z1b for the IP612, and an auxiliary Overlay Index is the 7.7.7.7.

At S7106, the PE3 is instructed to publish an RT-5 Z1c for the IP612, and an auxiliary Overlay Index is the 7.7.7.7.

At S7107, the PE1, the PE2, and the PE3 respectively publish the Z1a, the Z1b, and the Z1c.

It is to be noted that, S7104, S7105, S7106, and S7107 are before S7110.

Different from Embodiment 5, in this embodiment, in S7110, the TOR3 may learn, according to the Y1a, the Y1b, the Y1c, the X1a, the X1b, the X1c, the Z1a, the Z1b, and the Z1c, that the node to which the IP612 (i.e. the second IP) belongs may be reached via the node where the ESI321 (i.e. the first ESI) is located, and the IP612 is the Overlay next hop of the CE_Prefix3 (i.e. the first route), such that the TOR3 publishes an RT-5E routing message Y2c6 (i.e. the first routing message) for the CE_Prefix3, the ESI is the ESI321, and the ET-ID has the same value as the 7.7.7.7.

It is to be noted that, it may be learned, according to the Y1a and the X1a, that the 7.7.7.7 may be reached via the node where the ESI321 is located, and it may be learned, according to the Z1a, that the IP612 may be reached via the 7.7.7.7, such that it may be learned, according to the Y1a, the X1a, and the Z1a, that the IP621 may be reached via the ESI321.

It is to be noted that, if any one of the TOR1, the TOR2, and the TOR3 announces a route W1 in any one of an X group (i.e. the X1a, the X1b, the X1c), Y group (i.e. the Y1a, the Y1b, the Y1c), Z group (i.e. the Z1a, the Z1b, the Z1c), but the node does not announce a route W2 corresponding to the W1 in any one of the remaining two groups, in this case, it indicates that the proxying is poor in performance improvement effect or corresponding configuration information is incomplete (for example, misconfiguration), such that the TOR2 may select not to act as a proxy for the CE_Prefix3, but directly announces the GW-IP as the RT-5G route of the IP612. Some negative impacts caused by the proxying are further avoided by means of a mechanism of determining whether the proxy mechanism may improve the forwarding effect.

It is to be noted that, by introducing the Z-group route (for example, the Z1a) and using the Z-group route for iteration during proxying, the problem, that, when the Overlay next hop of the CE_Prefix3 is the IPv6 address (for example, the IP612), the corresponding RT-1 per EVI route cannot be published in this case as the IPv6 address cannot be carried in the first Ethernet tag identifier field, is solved.

It is to be noted that, the TOR1 and the TOR2 receive the Y2c6 sent by the TOR3; and since there are the same ESI and the same ET-ID in local, when the Y2c6 is installed on a forwarding plane, the Overlay next hop is replaced with the IP address (i.e., the 7.7.7.7) that has the same value as the ET-ID. When the DGW node receives the Y2c6, since there are no same ESI and same ET-ID in local, when the Y2c6 is installed on the forwarding plane, IP-aliasing is performed by using <the ESI, the ET-ID>.

It is to be noted that, in some implementations, the auxiliary Overlay Index may be carried by means of a BGP extended group attribute.

Embodiment 7

This embodiment is the same as Embodiment 6 except where otherwise noted.

Special illustrations of this embodiment of the present disclosure are as follows.

First, different from Embodiment 6, in this embodiment, the subnets of the R1 and the R2 that are directly connected to the TOR are also IPv6 subnets (which are respectively recorded as NH_SN1 and NH_SN2), such that, in S401, the IP prefix of the static route configured for the 7.7.7.7 is no longer the IPv4 prefix, but is an IPv6 prefix A6P7; and the A6P7 is obtained by mapping a BGP Router ID (i.e. the 7.7.7.7) of the VNF according to the following rules (which are recorded as Rule 1): the A6P7 is a 96-bit prefix, a high 64-bit of the A6P7 is a first specified value, and a low 32-bit of the A6P7 is the BGP Router ID.

It is to be noted that, on each PE adjacent to the VNF, the static route needs to be configured for the same A6P7.

Second, different from Embodiment 6, in this embodiment, the three routes of the X1a, the X1b, and the X1c published in S405 (the step inherited from Embodiment 4) are published for the A6P7; and the GW-IP of the X1a is an address of the R1 in the NH_SN1, the GW-IP of the X1b is an address of the R1 in the NH_SN1 or an address of the R2 in the NH_SN2, and the GW-IP of the X1c is an address of the R1 in the NH_SN2.

Third, different from Embodiment 6, in this embodiment, the TOR1 and the TOR2 receive the Y2c6 sent by the TOR3; and since there are the same ESI and the same ET-ID in local, when the Y2c6 is installed on the forwarding plane, the Overlay next hop is replaced with the IP address in the IPv6 prefix (i.e. the A6P7) that is formed by mapping, according to Rule 1, the IP address (i.e. the 7.7.7.7) that has the same value as the ET-ID.

It is to be noted that, the IP address in some IP prefix refers to the IP address that can match the IP prefix, for example, the 10.0.0.2 is the IP address in the IP prefix 10.0.0.0/24.

It is to be noted that, by mapping the BGP Router ID of the VNF into the IPv6 prefix, an IP address version of the CE_Prefix3, an IP address version of the next hop, and an IP address version of a directly-connected subnet between the CE and the PE are unified, such that a processing flow is simplified.

It is to be noted that, if the CE-BGP is established between the TOR2 and the R2, the CE_Prefix3 is directly learned (recorded as Situation 1) by means of the CE-BGP session. Compared with the situation (recorded as Situation 2) that the TORS sends the CE_Prefix3 to the TOR2 by means of the RT-5G route without proxy, under two situations, a forwarding table entry formed by installing the CE_Prefix3 on the forwarding plane is the same. The reason why the TOR2 can process the Situation 1 instead of the Situation 2 is that, the TOR2 is a low-end RT-5 node, which is only limited to analysis of a control plane on the RT-5G route (only supporting the installation of the RT-5G route onto the forwarding plane under the condition that there is an RT-2 route in which an NLRI-IP is equal to the GW-IP field of the RT-5G route); and for the forwarding plane, there is no processing limitation on other routes (for example, the CE_Prefix3 installed onto the forwarding plane in the Situation 1) with the same form (for example, the form of a corresponding FIB table entry) of the forwarding plane as the RT-5G route (i.e. the RT-5G route corresponding to the CE_Prefix3 in the Situation 2).

Embodiment 8

This embodiment is the same as Embodiment 4 except where otherwise noted.

This embodiment provides a method for publishing an RT-5 routing message. The method includes the following operation.

The first ESI is an ESI that needs to be passed through to reach first MAC, and an RT-5 route simultaneously carries a first route target, the first MAC, second MAC, and a first identifier. The first MAC is MAC corresponding to a fourth IP, the fourth IP is an IP in a first BD, and the fourth IP is the second IP or the second IP may be reached via the fourth IP; the first route target is an eRT of an IP-Virtual VRF instance to which the CE-Prefix belongs, the second MAC is MAC of an IRB interface of the first BD, and the first BD is a BD corresponding to a directly-connected subnet on the first device; the first identifier is an identifier of the first BD; the first MAC is configured to instruct the third device to take the first MAC as destination MAC when a data packet is sent to the first device according to the RT-5 route; the second MAC is configured to instruct the third device to take the second MAC as source MAC when the data packet is sent to the first device according to the RT-5 route; and the first ESI and the first identifier are configured to instruct the third device to determine the RT-1 route according to the first ESI and the first identifier when the data packet is sent to the first device according to the RT-5 route.

In an embodiment, the RT-5 route also carries a first indicator. The first indicator is configured to instruct the third device to package the source MAC and the destination MAC when the data packet is sent to the first device according to the RT-5 route.

Other special illustrations of this embodiment of the present disclosure are as follows.

First, different from Embodiment 4, in this embodiment, an ES10 and an ES20 (an identifier ESI22 is the first ESI) access an IPVRF1 by means of a BD on a TOR; an R1 accesses the IPVRF1 by means of a BD1, and an R2 accesses the IPVRF1 by means of a BD2 (i.e., the first BD); an interface on each node that connects the BD1 and the IPVRF1 is an IRB1, an interface that connects the BD2 and the IPVRF2 is an IRB2 (i.e., the first IRB), and accordingly, 10.0.0.9 (i.e., 10.9 shown in FIG. 4) and 20.0.0.9 (not shown in the figure) respectively are IP addresses of the IRB1 and the IRB2. In this embodiment, the IRB1s on different nodes have the same MAC address, which is recorded as MAC2a, and the IRB2s on different nodes have the same MAC address, which is recorded as MAC2b (i.e., the second MAC); the MAC of the 10.2 is MAC1a, and the MAC of the 20.2 (i.e., the fourth IP) is recorded as MAC1b (i.e., the first MAC); and the BD2 is identified by means of an Ethernet Tag ID (i.e., a first identifier) of ETI8 in an EVPN.

Second, different from Embodiment 4, in this embodiment, EVPN tags in ET1, ET2, ET3, and ET4 are configured to determine the EVPN tag of the BD1 or the BD2. By using the ET4 as an example, the EVPN tag (i.e., a first tag) is an EVPN tag that is used to determine the BD2 on a TOR3; and RTs in the ET1, the ET2, the ET3, and the ET4 are not eRT of the BD1 or the BD2, but the eRT (i.e. a first RT) of the IPVRF1 (i.e. a first IP-VRF instance).

Third, different from Embodiment 4, in this embodiment, a finally-published RT-5E route also needs to carry the first MAC and the second MAC; the first MAC is the MAC1$b$ in this embodiment; and the second MAC is the MAC2$b$ in this embodiment.

Fourth, different from Embodiment 4, in this embodiment, the following steps further need to be described with reference to FIG. 7.

Figure 7:
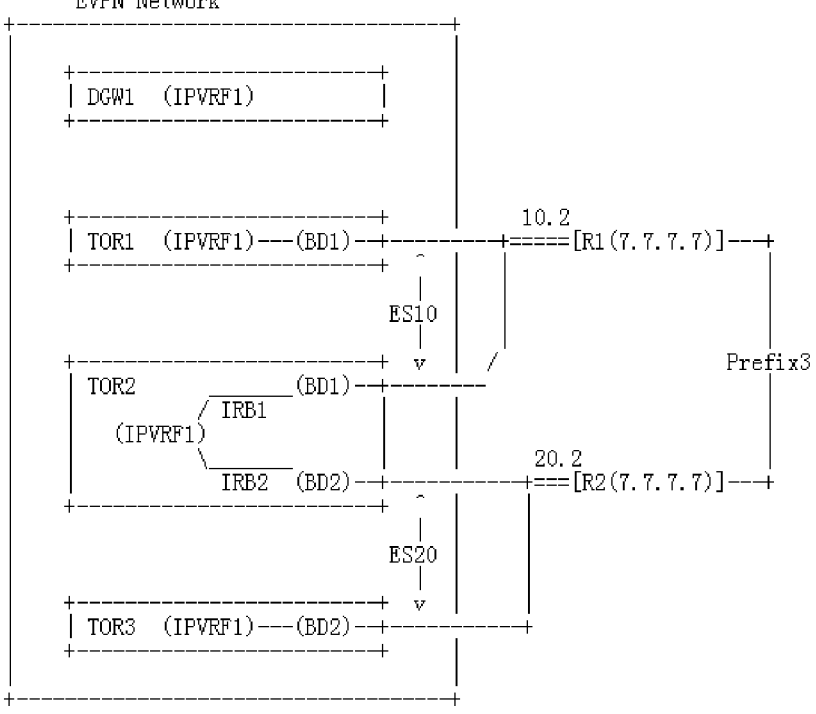
FIG. 7 is a schematic diagram of assembly connection in an EPVN according to an embodiment of the present disclosure.

FIG. 7 is a schematic diagram of assembly connection in an EPVN according to an embodiment of the present disclosure.

At S8090, the TOR3 learns an IP prefix CE_Prefix3 (i.e., 8.8.8.0/24) behind the R2 (also behind the R1) by means of a CE-BGP session S2003, and a private network next hop of the CE_Prefix3 is 7.7.7.7.

At S8100, the TOR3 respectively receives the ET1, the ET2, the ET3, an X1$a$, and an X1$b$ from a PE1 and a PE2.

It is to be noted that, the ET4 and an X1$c$ are routes that are published by the TOR3, and may be assumed to have been received from itself before being sent.

At S8110, the TOR3 may learn, according to the ET1, the ET2, the ET3, the ET4, the X1$a$, the X1$b$, and the X1$c$, that a node to which the 7.7.7.7 (i.e. the second IP) may be reached via a node where an ESI21 or an ESI22 is located, and the 7.7.7.7 is an Overlay next hop of the CE_Prefix3 (i.e., the first route), such that the TOR3 publishes an RT-5E routing message Y2$c$8 (i.e. a first routing message) for the CE_Prefix3, an ESI is the ESI22 (i.e. the first ESI), and an ET-ID is ETI8,RMAC (Router's MAC, the first MAC). By carrying the second MAC using a BGP attribute (for example, a TLV, a group attribute, or an extended group attribute), the second MAC and the first MAC may be distinguished by means of a type code of the BGP attribute.

It is to be noted that, the TOR3 selects the ESI22 instead of the ESI21, and the reason is that the ESI22 is an ESI to which an AC belongs in the BD corresponding to some local directly-connected subnet (i.e., a subnet 20.0.0.0/24 where the IRB2 is located).

At S8120, the TOR2 (the PE2) receives the RT-5E routing message Y2$c$8 and the RT-1 per EVI routing messages ET3 and ET4, such that the TOR2 may forward a data message DP888 in which a destination IP is 8.8.8.0/24 to a first AC (i.e. the AC of the BD2 on the TOR2 on the ES20) or the TOR3, as the ESI and ET-ID of the Y2$c$8 are the same as the ESIs and ET-IDs of the ET3 and the ET4.

It is to be noted that, although the TOR2 does not directly learn the route of the CE_Prefix3 with a private network next hop being 20.0.0.2 from CE-BGP, the TOR2 may also forward the DP888 from the first AC, this is because the first AC and the Y2$c$8 have the same ESI and ET-ID. By simultaneously carrying the ESI and the ET-ID corresponding to the first AC in the Y2$c$8, in this embodiment, the problem that an RT-5 route (for example, the Y2$c$8) without carrying the private network next hop and synchronized by a remote PE (for example, the TOR3) cannot correspond to the AC (for example, the first AC) in the local BD (for example, the BD2 on the TOR2) is solved, such that the technical effect of directly locally forwarding the data message (for example, the DP888) corresponding to the RT-5 route may be achieved, thereby improving a utilization rate of a bandwidth between the PE and the CE, and enhancing the uniformity of load sharing in the case of load sharing.

It is to be noted that, when the TOR2 selects to perform load sharing between the first AC and the TOR3, and the TOR3 selects to perform load sharing between the TOR2 and a third AC (i.e., the AC on the BD2 on the TOR3 on the ES20), the data message (for example, the DP888) load-shared to the TOR3 by the TOR2 is not sent back to the TOR2 by the TOR3. Likewise, the data message load-shared to the TOR2 by the TOR3 is not sent back to the TOR3 by the TOR2, such that the problem of ping-pong transfer of the data message between the TOR2 and the TOR3 caused by mutual load sharing is avoided.

It is to be noted that, the reason why the data message load-shared to the TOR3 by the TOR2 is not sent back to the TOR2 by the TOR3 is that, when the TOR2 sends the data message (for example, the DP888) to the TOR3, an EVPN tag encapsulated according to the ET4 is a tag for identifying the BD2, such that the DP888 only performs, on the TOR3, MAC forwarding in the BD2, instead of performing IP forwarding in the IPVRF1, and because a load sharing behavior is only a forwarding behavior in the IPVRF1, the DP888 no longer perform the load sharing behavior when reaching the TOR3, such that the problem of forwarding the data message back and forth caused by the load sharing behavior in the IP-VRF is avoided, so as to avoid bandwidth waste, and prevent the bandwidth of normal flow from being occupied by these ping-pong flows, thereby improving the safety of the normal flow.

At S8130, the TOR2 (the PE2) receives the EVPN data message DP888 in which the destination IP is 8.8.8.0/24, and the DP888 is an IP message; when the DP888 is forwarded according to the Y2$c$8, the TOR2 may learn, according to the first indicator, that an Ethernet header needs to be added to the DP888; and the source MAC of the Ethernet header is the second MAC, and the destination MAC is the first MAC.

It is to be noted that, in an implementation, the TLV in the Y2$c$8 that is configured to carry the second MAC or the type code of a route attribute may be used as the first indicator.

It is to be noted that, regardless of the fact that the TOR2 forwards the DP888 out or forwards the DP888 to the TOR3, the source MAC and the destination MAC are both encapsulated (referring to S8130) according to the indication of the first indicator in the Y2$c$8, and an ARP/ND table entry does not need to be checked here, such that the forwarding efficiency is improved, the complexity of a forwarding flow is reduced, and the cost of forwarding chips is reduced.

It is to be noted that, in this embodiment, an IRB interface corresponding to the BD1 or the BD2 does not need to exist on the DGW1, and the IRB interface corresponding to the BD2 also does not need to exist on the TOR1, such that when these nodes forward the DP888 according to the ET1 or the ET2, proper source MAC cannot be filled for the DP888; if the filling of the source MAC is improper, an abnormal MAC forwarding table entry on the CE side may be caused; and by carrying the second MAC in the Y2$c$8, in this embodiment, the problem of the abnormal CE-side MAC forwarding table entry caused by the improper filling of the source MAC is avoided, thereby improving the safety of the network.

At S8140, the TOR1 (the PE1) receives the RT-5E routing message Y2$c$8 and the RT-1 per EVI routing messages ET2 and ET3, such that the TOR1 may forward the data message DP888 in which the destination IP is 8.8.8.0/24 to a second AC (i.e., the AC of the BD1 on the TOR1 on the ES10).

It is to be noted that, as the ESI and ET-ID of the Y2c8 are the same as the ESI and ET-ID of the ET3, the ET3 and the ET2 are both from the same PE node (i.e., the TOR2), the first MAC is the MAC (i.e., the MAC1a) of a host (i.e., the 10.2) in the BD (i.e., the BD1) to which the second AC belongs, and this is based on that fact that, during network planning, the MAC1a (the MAC of the next hop 10.2 of the second IP in the subnet 10.0.0.0/24 corresponding to the BD1, and simply called the next hop MAC of the second IP corresponding to the BD1) and the MAC1b (the MAC of the next hop 20.2 of the second IP in the subnet 20.0.0.0/24 corresponding to the BD2, and simply called the next hop MAC of the second IP corresponding to the BD2) are planned as the same MAC address.

It is to be noted that, by planning the next hop MAC of the second IP corresponding to the BD1 and the next hop MAC of the second IP corresponding to the BD2 as the same MAC value in advance, in this embodiment, the problem that, when there is no ES (for example, the ES20) identified by the ESI (for example, the ES20 as the first ESI) of the RT-5E route on the node (for example, the TOR1) receiving the RT-5E routing message (for example, the Y2c8) or there is no Ethernet Tag identified by the ET-ID (i.e. the first Ethernet tag identifier field) of the RT-5E route, the data message (for example, the DP888) corresponding to the RT-5E route cannot be forwarded from a local AC (for example, the second AC) nearby, but can only bypass (passing through more PEs while still ending up at the same VNF is therefore called a bypass) from a remote end (for example, the TOR2 or the TOR3), is further solved.

For ease of description, when there is no ES identified by the ESI of the RT-5E route on the node receiving the RT-5E routing message or there is no Ethernet Tag identified by the ET-ID of the RT-5E route, if the data message can be forwarded out from the local AC when being forwarded according to the RT-5E route, it may be called that the node receiving the RT-5E route may perform localization on the RT-5E route. The localization is to use at least one local AC as a forwarding outbound interface of the RT-5E route.

It is to be noted that, since the R1 and the R2 belong to the same VNF and the IP addresses 10.2 and 20.2 belong to different BDs, it is technically easy to implement the addresses as the same MAC address. Furthermore, since the same VNF is alternately connected to different paired TORs by means of different <ESI, ET-ID> combinations, as long as there are a Combination 1, a Combination 2, and a Combination 3 meeting a third condition in an entry node and an exit node, the node receiving the RT-5E routing message may perform localization on the RT-5E route. The third condition includes: the Combination 1 being adjacent to the entry node, the Combination 3 being adjacent to the exit node, and the entry node and the exit node respectively have at least one common adjacent node (a PE node having the IP-VRF instance thereon) with the Combination 2, where the Combination 1, the Combination 2, and the Combination 3 may be completely or partially the same combination.

It is to be noted that, when the CE is the VNF, it is convenient to meet the third condition, such that it is convenient to implement by determining, by using the meeting of the third condition as a criterion, whether the received RT-5E route may be localized, such that network management works required for localization are simplified.

It is to be noted that, when the received RT-5E route is localized according to the third condition, localization means that the entry node takes a fourth AC as a forwarding outbound interface of the RT-5E route. The fourth AC is a local AC on the entry node corresponding to the Combination 1.

It is to be noted that, the third condition may also determine, in conjunction with a fourth condition and a fifth condition, whether the received RT-5E route may be localized. The fourth condition is that the first MAC carried in the RT-5E route is the MAC in the BD to which the fourth AC belongs and/or the second MAC carried in the RT-5E route is the MAC address of the IRB interface corresponding to the BD to which the fourth AC belongs; and the fifth condition is that the RT-5E route carries the first indicator.

It is to be noted that, the received RT-5E route is localized by simultaneously meeting the third condition, the fourth condition, and the fifth condition, such that, in this embodiment, abnormal forwarding caused by inappropriate localization due to misconfiguration on the received RT-5E route is further prevented, thereby simplifying constraint conditions of network planning and configuration.

It is to be noted that, when determining whether the RT-5E route may be localized by means of the second MAC carried in the RT-5E route in the fourth condition, the network is more efficient than the fact of determining whether the RT-5E route may be localized by means of the first MAC carried in the RT-5E route, because the second MAC only needs to be compared with the MAC of the IRB interface, and the first MAC needs to be found in all MAC of the BD, such that the latter is low in efficiency.

It is to be noted that, since the TOR2 is the low-end RT-5 node, the TOR3 converts the route that is originally published by using the RT-5G routing message (i.e., an original RT-5G routing message) with the GW-IP being the 7.7.7.7 into the route published by using the RT-5E routing message, so as to simplify the processing on the TOR2. In addition, since the TOR2 and TOR3 nodes both publish the RT-1 per EVI route for the <ESI22, ETI8>, the TOR2 may perform protection or load sharing on the data message between the ACs of the two TOR nodes.

It is to be noted that, by means of using the exit node (for example, for the Y2c8, the node sending the Y2c8 is the exit node) to directly assign the source MAC to the entry node (for example, for the Y2c8, the node receiving the Y2c8 is the entry node), a source MAC finding flow is removed, such that the forwarding efficiency is improved, requirements for the entry node are simplified, and implementation is easy to realize when the entry node is the low-end RT-5 node.

It is to be noted that, by removing the dependency on the need for the presence of the IRB interface on the entry node corresponding to the BD (for example, the BD2) to which an exit AC (for example, the AC of the BD2 on the ES20) belongs, the dependency on the need for the presence of the BD to which the exit AC belongs on the entry node is removed, such that the data message can also be forwarded for the CE-Prefix without the entry node of the BD, and it is not necessary to configure the BD (for example, the BD2 does not need to be configured on the DGW1) on the PE node (for example, there is no local host in a 20.0.0.0/24 subnet on the DGW1) that does not have the local host in the subnet corresponding to the BD simply to activate the capability of forwarding the data message for the CE-Prefix that is forwarded by the exit AC, thereby simplifying network deployment, and reducing the difficulty of network deployment.

Embodiment 9

This embodiment is the same as Embodiment 8 except where otherwise noted.

Special illustrations of this embodiment of the present disclosure are as follows.

Different from Embodiment 8, the 10.2 and the 20.2 are located on different Ethernet Tags (which are identified by Ethernet Tags) on the same ES, instead of being located on two different ESes. In other words, in this embodiment, the ES10 and the ES20 represent the same ES, and the ES is recorded as the ES2010; the ESI21 and the ESI22 represent the same ESI, and the ESI is recorded as the ESI2010; and the ESI2010 is configured to identify the ES2010. Therefore, in this embodiment, the ESIs in the Y2c8, the ET1, the ET2, the ET3, and the ET4 are all ESI2010.

Different from Embodiment 8, in this embodiment, the ET1 and the ET2 also carry the MAC2*a*, and the ET3 and the ET4 also carry the MAC2*b* (i.e., the second MAC).

Different from Embodiment 8, in this embodiment, the ET1, the ET2, the ET3, and the ET4 also need to carry the first MAC, and the first MAC is the MAC1*a* or the MAC1*b*; and by using the ET4 as an example, the first MAC carried by the ET4 is the MAC1*b*.

Different from Embodiment 8, in this embodiment, the ET1, the ET2, the ET3, and the ET4 also need to carry the second MAC, and the second MAC is the MAC of the IRB of the BD to which the RT-1 per EVI route (i.e., the ET1, the ET2, the ET3, or the ET4) belongs; and by using the ET4 as an example, the second MAC carried by the ET4 is the MAC2*b*.

Different from Embodiment 8, in this embodiment, on the node receiving the Y2c8 route, when a data message DP888b (which has the same destination IP as the DP888 but is received on a different node) is sent to the host in the CE_Prefix3 according to the Y2c8 route, it is not limited to determine the corresponding RT-1 per EVI route according to the ET-ID in the Y2c8, as long as the ESI of an RT-1 per EVI route RT1_for9 is the same as that of the Y2c8, and the RT1_for9 and the Y2c8 belong to the same IP-VRF, the route may be configured to forward the DP888b. However, in some implementations, the route having the same ET-ID as the Y2c8 may have a higher priority to be preferred.

Through such improvement, the node (for example, the DGW1) receiving the Y2c8 route may not only send the DP888b to the TOR2 and the TOR3 according to the ET3 and the ET4, but also send the DP888b to the TOR1 and the TOR2 according to the ET1 and the ET2. The ET2 and the ET3 both correspond to the TOR2, such that when the DGW1 performs load sharing on the DP888b, the TOR2 has a 2/4 rather than 1/3 chance of being selected as the destination node for a tunnel to the DP888b. Since bandwidth resources (i.e., a physical link to the ES2010) that may be configured to forward the DP888b on the TOR2 are more sufficient than that on the TOR1 and the TOR3, the accuracy of load sharing may be improved by means of the method.

It is to be noted that, the Y2c8 can only carry the MAC of the IRB of the BD2. However, when the DGW1 sends the DP888b to the TOR1 and finally forwards the DP888b to the R1 from the second AC, the source MAC expected by the R1 is the MAC of the IRB of the BD1. By carrying the second MAC in the RT-1 per EVI route (a form of the RT-1 route), the exit node is different second MACs that may be carried in the RT-1 per EVI route published by the AC in different BDs, such that different source MACs may be encapsulated when the entry node forwards the DP888b to different exit ACs (for example, forwarding to the second AC according to the ET1, and forwarding to the third AC according to the ET4) according to different RT-1 per EVI routes.

It is to be noted that, the situation that the second MACs carried by the RT-1 route and the RT-5 route are different is described in the technical solutions of this embodiment. Compared with other embodiments, in this embodiment, by means of such situation of preferably using the second MAC in the RT-1 route as the source MAC, the problem, that the source MAC received by the CE may not meet expectations caused by encapsulation of the source MAC according to the second MAC in the RT-5E route, is solved, such that the requirement of requesting to plan the MAC addresses of the IRBs (for example, the IRB1 and the IRB2) of different BDs into the same MAC address is avoided, thereby simplifying network planning.

Embodiment 10

This embodiment is the same as Embodiment 8 or Embodiment 9 except where otherwise noted.

Special illustrations of this embodiment of the present disclosure are as follows.

In this embodiment, the ET1, the ET2, the ET3, and the ET4 also need to carry the eRTs of the corresponding BDs, and own RT-1 per EVI route is no longer published for the same AC in the BD.

It is to be noted that, the ET1, the ET2, the ET3, and the ET4 may be cited (for Layer 2 forwarding) by an MAC forwarding table entry in the BD, and may also be cited (for Layer 3 forwarding) by an IP forwarding table entry in the IP-VRF.

It is to be noted that, compared with the fact that the BD and the IP-VRF respectively publish different (for example, the RD and the RT are different) RT-1 per EVI routes for the same AC, in this embodiment, the corresponding BD (the BD to which the AC belongs) and IP-VRF (the IP-VRF of the IRB of the BD to which the AC belongs) instances publish the same RT-1 per EVI route (i.e., the RT-1 per EVI route simultaneously carrying the eRT of the BD and the eRT of the IP-VRF) for the same AC, such that the number of RT-1 routes is greatly reduced, and routing and forwarding resources and processor resource consumption in the EVPN are reduced.

It is to be noted that, in Embodiment 8, the EVPN tag encapsulated when the data message is forwarded in the IP-VRF according to the RT-1 route may be the EVPN tag identifying the BD; and in this embodiment, the RT-1 per EVI routes published for the corresponding BD and IP-VRF by the same AC may be merged.

It is to be noted that, a route publication mechanism described in the present disclosure may be a route publication mechanism that is relayed via a Route Reflector (RR).

An RT-5G route publishing mechanism in the present disclosure may be used in any EVPN, especially in a DC network, and is a general technical solution. On the basis of the RT-5G route publishing mechanism, when there is the low-end RT-5 node in a DC, a DGW can also publish the RT-5G route for the CE-Prefix.

This embodiment further provides an apparatus for publishing an RT-5G routing message. The apparatus is configured to implement the above embodiments and preferred implementations, and what has been described will not be described again. As used below, the term "module" may be a combination of software and/or hardware that implements a predetermined function. Although the device described in the following embodiments is preferably implemented in software, but implementations in hardware, or a combination of software and hardware, are also possible and conceived.

Figure 8:
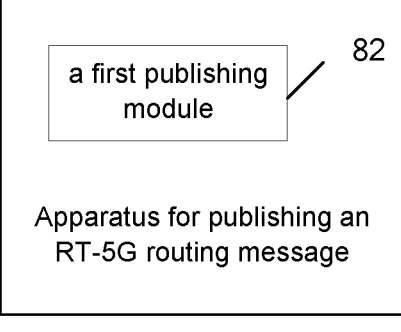
FIG. 8 is a structural block diagram I of an apparatus for publishing an RT-5G routing message according to an embodiment of the present disclosure.

FIG. 8 is a structural block diagram I of an apparatus for publishing an RT-5G routing message according to an embodiment of the present disclosure. As shown in FIG. 8, the apparatus may be applied to a first device, and includes a first publishing module 82, configured to publish an RT-5G routing message for a CE-Prefix to enable a low-end RT-5 node to receive the RT-5G routing message. A GW-IP field of the RT-5G routing message carries a first IP; a next hop of Overlay of the CE-Prefix is a second IP, and the second IP is allowed to be reached by means of a node to which the first IP belongs; the RT-5G routing message is configured to instruct the low-end RT-5 node to analyze the GW-IP field carried in the RT-5G routing message into an RT-2 route; and the second IP is not in a directly-connected subnet of an EVPN.

By means of the above step, according to the method of the present disclosure, the first device publishes the RT-5G routing message for the CE-Prefix to enable the low-end RT-5 node to receive the RT-5G routing message; the GW-IP field of the RT-5G routing message carries the first IP; the next hop of Overlay of the CE-Prefix is the second IP, and the second IP is allowed to be reached by means of the node to which the first IP belongs; and the RT-5G routing message is configured to instruct the low-end RT-5 node to analyze the GW-IP field carried in the RT-5G routing message into the RT-2 route. Compared with the prior art, by means of using a mechanism of replacing the value of the GW-IP in the RT-5G route, the problem that a routing sender announces the RT-5G route to a receiving end for the CE-Prefix of a CE when the low-end RT-5 node as the receiving end is not updated is solved, i.e. the problem that a limited node cannot be forwarded to a data message of the CE-Prefix according to the RT-5G route. Furthermore, the RT-5G route does not cause the corresponding data message to bypass via a GW (the CE is not adjacent to the GW).

In an embodiment, when the GW-IP field of the RT-5G routing message carries the first IP, the RT-5G routing message is further configured to indicate a data message that is forwarded to the CE-Prefix by the low-end RT-5 node according to forward information in the RT-2 route.

In an embodiment, before the first device publishes the RT-5G routing message for the CE-Prefix to enable the low-end RT-5 node to receive the RT-5G routing message, an embodiment of the present disclosure further provides the following technical solution. The method includes: determining whether the first device receives the RT-2 route corresponding to the first IP; if so, carrying the first IP in the GW-IP field of the RT-5G routing message; and if no, carrying the second IP in the GW-IP field of the RT-5G routing message.

In an embodiment, before the first device publishes the RT-5G routing message for the CE-Prefix to enable the low-end RT-5 node to receive the RT-5G routing message, when a second condition is met, the first IP is carried in the GW-IP field of the RT-5G routing message. The second condition includes: a node to which a third IP belongs being able to be reached via the first IP, the second IP being able to be reached via the third IP, and there being no Overlay Index in the route corresponding to the first IP or the Overlay Index being not an IP address.

In an embodiment, the first IP corresponds to a first set. The first set consists of PE nodes; the PE nodes in the first set all announce RT-5G routes indicating that the second IP is allowed to be reached via the first IP; other PE nodes do not announce, in the EVPN, RT-5G routes indicating that the second IP is allowed to be reached via other private IPs; and other PE nodes are nodes in the EVPN other than the PE nodes in the first set.

In an embodiment, the first IP corresponds to a second set. The second set consists of PE nodes; the PE nodes in the second set all announce RT-5G routes indicating that the second IP is allowed to be reached via the first IP; and for a target PE node in other PE nodes, if the target PE node announces, in the EVPN, RT-5G routes indicating that the second IP may be reached via an Xth IP, and the number of all PE nodes in the EVPN that announce the RT-5G routes indicating that the second IP may be reached via the Xth IP is less than the number of the PE nodes of the second set; and it is determined that the IP corresponding to the second set is carried in the GW-IP field of the RT-5G routing message.

Figure 9:
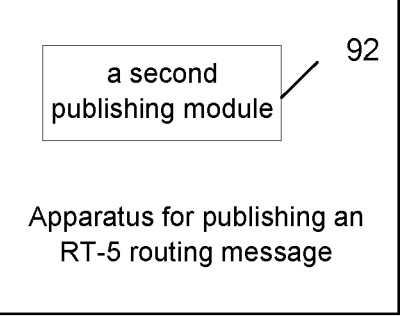
FIG. 9 is a structural block diagram II of an RT-5 routing message publishing apparatus according to an embodiment of the present disclosure.

FIG. 9 is a structural block diagram II of an RT-5 routing message publishing apparatus according to an embodiment of the present disclosure. As shown in FIG. 9, the RT-5 routing message publishing apparatus includes a second publishing module.

The second publishing module 92 is configured to publish an RT-5 routing message for a CE-Prefix to enable a low-end RT-5 node to receive the RT-5 routing message. An ESI field of the RT-5 routing message carries a first ESI; a next hop of Overlay of the CE-Prefix is a second IP, and the second IP is allowed to be reached by means of a node to which the first ESI belongs; and the RT-5 routing message is configured to instruct the low-end RT-5 node to analyze the ESI field carried in the RT-5 routing message into an RT-1 route.

By means of the above solution, according to the method of the present disclosure, the first device publishes the RT-5G routing message for the CE-Prefix to enable the low-end RT-5 node to receive the RT-5G routing message; the GW-IP field of the RT-5G routing message carries the first IP; the next hop of Overlay of the CE-Prefix is the second IP, and the second IP is allowed to be reached by means of the node to which the first IP belongs; and the RT-5G routing message is configured to instruct the low-end RT-5 node to analyze the GW-IP field carried in the RT-5G routing message into the RT-2 route. Compared with the prior art, by means of using a mechanism of replacing the value of the GW-IP in the RT-5G route, the problem that a routing sender announces the RT-5G route to a receiving end for the CE-Prefix of a CE when the low-end RT-5 node as the receiving end is not updated is solved, i.e. the problem that a limited node cannot be efficiently forwarded to a data message of the CE-Prefix according to the RT-5G route. Furthermore, the RT-5G route does not cause the corresponding data message to bypass via a GW (the CE is not adjacent to the GW).

It is to be noted that, when a PE publishes the simplified RT-5G for other PEs, regardless of whether an opposite end is a low-end RT-5 node, the efficiency of processing the RT-5G route is improved, and all will benefit. For an opposite end node that is indeed the low-end RT-5 node, the node is made from being unable to be processed before simplification to being able to be processed after simplification.

In an embodiment, when the ESI field of the RT-5 routing message carries the first ESI, the RT-5 routing message is further configured to indicate a data message that is forwarded to the CE-Prefix by the low-end RT-5 node according to forward information in the RT-1 route.

In an embodiment, an embodiment of the present disclosure further provides a technical solution before the first device publishes the RT-5 routing message for the CE-Prefix to enable the low-end RT-5 node to receive the RT-5 routing message. The method specifically includes: determining whether the first device receives the RT-1 route corresponding to the first ESI; if so, carrying the first ESI in the ESI field of the RT-5 routing message; and if no, carrying the second IP in the GW-IP field of the RT-5G routing message.

In an exemplary embodiment, the computer-readable storage medium may include, but is not limited to, a USB flash disk, a Read-Only Memory (ROM), a Random Access Memory (RAM), and various media that can store computer programs, such as a mobile hard disk, a magnetic disk, or an optical disk.

For specific examples in this embodiment, refer to the examples described in the foregoing embodiments and the exemplary implementations, and this embodiment will not be repeated thereto.

This embodiment of the present disclosure further provides an electronic apparatus. The electronic apparatus includes a memory and a processor. The memory is configured to store a computer program. The processor is configured to run the computer program to execute steps in any one of method embodiments described above.

In an embodiment, in this embodiment, the processor may be configured to perform the following steps through the computer program.

At S1, a first device publishes an RT-5G routing message for a CE-Prefix to enable a low-end RT-5 node to receive the RT-5G routing message. A GW-IP field of the RT-5G routing message carries a first IP; a next hop of Overlay of the CE-Prefix is a second IP, and the second IP is allowed to be reached by means of a node to which the first IP belongs; the RT-5G routing message is configured to instruct the low-end RT-5 node to analyze the GW-IP field carried in the RT-5G routing message into an RT-2 route; and the second IP is not in a directly-connected subnet of an EVPN.

In an embodiment, in other embodiments, the processor may also be configured to perform the following steps through the computer program.

At S1, a first device publishes an RT-5 routing message for a CE-Prefix to enable a low-end RT-5 node to receive the RT-5 routing message. An ESI field of the RT-5 routing message carries a first ESI; a next hop of Overlay of the CE-Prefix is a second IP, and the second IP is allowed to be reached by means of a node to which the first ESI belongs; and the RT-5 routing message is configured to instruct the low-end RT-5 node to analyze the ESI field carried in the RT-5 routing message into an RT-1 route; and send the RT-5 routing message to a third device.

In an exemplary embodiment, the electronic apparatus may further include a transmission device and an input/output device. The transmission device is connected to the processor. The input/output device is connected to the processor.

For specific examples in this embodiment, refer to the examples described in the foregoing embodiments and the exemplary implementations, and this embodiment will not be repeated thereto.

It is apparent that those skilled in the art should understand that the above-mentioned modules or steps of the present disclosure may be implemented by a general computing device, and may also be gathered on a single computing device or distributed in network composed of multiple computing devices. The above mentioned modules or steps of the present application may be implemented with program codes executable by the computing device, so that may be stored in a storage device for execution by the computing device, and in some cases, the steps shown or described may be performed in a different sequence than herein, or can be fabricated into individual integrated circuit modules respectively, or multiple modules or steps thereof are fabricated into a single integrated circuit module for implementation. In this way, the present disclosure are not limited to any specific combination of hardware and software.

The above are only the preferred embodiments of the disclosure and are not intended to limit the disclosure. For those skilled in the art, the disclosure may have various modifications and variations. Any modifications, equivalent replacements, improvements, and the like made within the principle of the disclosure shall fall within the scope of protection of the present disclosure.

What is claimed is:

1. A method for publishing an RT-5G routing message, comprising: publishing, by a first device, an RT-5G routing message for a Customer Edge (CE)-Prefix to enable a limited RT-5 node to receive the RT-5G routing message, wherein a GW-IP field of the RT-5G routing message carries a first Internet Protocol (IP); a next hop of Overlay of the CE-Prefix is a second IP, and the second IP is allowed to be reached by means of a node to which the first IP belongs; the RT-5G routing message is configured to instruct the limited RT-5 node to analyze the GW-IP field carried in the RT-5G routing message into an RT-2 route; and the second IP is not in a directly-connected subnet of an Ethernet Virtual Private Network (EVPN).

2. The method according to claim 1, further comprising:

when the GW-IP field of the RT-5G routing message carries the first IP, the RT-5G routing message is further configured to indicate a data message that is forwarded to the CE-Prefix by the limited RT-5 node according to forward information in the RT-2 route.

3. The method according to claim 1, wherein before the first device publishes the RT-5G routing message for the CE-Prefix to enable the limited RT-5 node to receive the RT-5G routing message, the method further comprises:

determining whether the first device receives the RT-2 route corresponding to the first IP;

when the first device receives the RT-2 route corresponding to the first IP, carrying the first IP in the GW-IP field of the RT-5G routing message; and when the first device does not receive the RT-2 route corresponding to the first IP, carrying the second IP in the GW-IP field of the RT-5G routing message.

4. The method according to claim 1, wherein before the first device publishes the RT-5G routing message for the CE-Prefix to enable the limited RT-5 node to receive the RT-5G routing message, the method further comprises:

when a second condition is met, carrying the first IP in the GW-IP field of the RT-5G routing message, wherein the second condition comprises: a node to which a third IP belongs being able to be reached via the first IP, the second IP being able to be reached via the third IP, and there being no Overlay Index in the route corresponding to the first IP or the Overlay Index being not an IP address;

the method further comprising:

the first IP corresponding to a first set, wherein the first set consists of Provider Edge (PE) nodes; the PE nodes in the first set all announce routes indicating that the second IP is allowed to be reached via the first IP; other PE nodes do not announce, in the EVPN, routes indicating that the second IP is allowed to be reached via other private IPs; and other PE nodes are nodes in the EVPN other than the PE nodes in the first set; or the first IP corresponding to a second set, wherein the second set consists of PE nodes; the PE nodes in the second set all announce routes indicating that the second IP is allowed to be reached via the first IP; and for a target PE node in other PE nodes, if the target PE node announces, in the EVPN, routes indicating that the second IP is able to be reached via an Xth IP, and the number of all PE nodes in the EVPN that announce the routes indicating that the second IP is able to be reached via the Xth IP is less than the number of the PE nodes of the second set; and determining that the IP corresponding to the second set is carried in the GW-IP field of the RT-5 routing message.

5. A method for publishing an RT-5 routing message, comprising: publishing, by a first device, an RT-5 routing message for a Customer Edge (CE)-Prefix to enable a limited RT-5 node to receive the RT-5 routing message, wherein an Ethernet Segment Identifier (ESI) field of the RT-5 routing message carries a first ESI; a next hop of Overlay of the CE-Prefix is a second Internet Protocol (IP), and the second IP is allowed to be reached by means of a node to which the first ESI belongs; the RT-5 routing message is configured to instruct the limited RT-5 node to analyze the ESI field carried in the RT-5 routing message into an RT-1 route; and sending the RT-5 routing message to a third device.

6. The method according to claim 5, further comprising:

the first ESI being an ESI that needs to be passed through to reach first Media Access Control (MAC), and an RT-5 route simultaneously carrying a first route target, the first MAC, and a first identifier, wherein the first MAC is MAC corresponding to a fourth IP, the fourth IP is an IP in a first Broadcast Domain (BD), and the fourth IP is the second IP or the second IP is able to be reached via the fourth IP; the first route target is an export Route Target (eRT) of an IP-Virtual Routing Forwarding (VRF) instance to which the CE-Prefix belongs, and the first BD is a BD corresponding to a directly-connected subnet on the first device; the first identifier is an identifier of the first BD; the first MAC is configured to instruct the third device to take the first MAC as destination MAC when a data packet is sent to the first device according to the RT-5 route; and the first ESI and the first identifier are configured to instruct the third device to determine the RT-1 route according to the first ESI and the first identifier when the data packet is sent to the first device according to the RT-5 route; and publishing a third route by the first device, wherein the third route is the RT-1 route, and an ESI of the third route is the first ESI; a first Ethernet tag identifier field is the first identifier; the third route and/or the RT-5 route also carries second MAC; and the second MAC is configured to instruct the third device to take the second MAC as source MAC when the data packet is sent to the first device according to the third route.

7. The method according to claim 6, further comprising:

the third route also carrying a first tag, and the RT-5 route and/or the third route also carrying a first indicator, wherein the first tag is configured to determine a tag of the first BD, and the first indicator is configured to instruct the third device to package the source MAC and the destination MAC when the data packet is sent to the first device according to the RT-5 route.

8. The method according to claim 6, further comprising:

the third route also carrying a first route target, and there being no first BD on the third device, and a first IP-VRF instance on the third device not importing an eRT of the first BD, wherein the first IP-VRF instance is the IP-VRF instance that imports the RT-5 route.

9. The method according to claim 6, further comprising:

receiving a first RT-5E route by the first device, and when at least one of a third condition, a fourth condition, or a fifth condition is met, performing localization for the first RT-5E route, wherein the first RT-5E route is an RT-5E route published by the third device; the third condition is that a first node set, a second node set, and a third node set meet a sixth condition; the fourth condition is that the first MAC carried in the first RT-5E route is MAC in a BD to which a fourth Access Controller (AC) belongs and/or the second MAC carried in the RT-5E route is an MAC of an IRB interface corresponding to the BD to which a fourth AC belongs; the fifth condition is that the RT-5E route carries the first indicator; localization is to take the fourth AC as a forwarding outbound interface of the first RT-5E route; the first node set is a node set having a first tuple, the second node set is a node set having a second tuple, and the third node set is a node set having a third tuple; the sixth condition is that an intersection between the first node set and the second node set is not null and an intersection between the third node set and the second node set is not null; the fourth AC is an AC on the first device; the BD corresponds to a local subnet in a tenth IP-VRF instance that imports the first RT-5E route; the first tuple is <ESI, Ethernet Tag ID> to which the fourth AC belongs; the second tuple is <ESI, Ethernet Tag ID> in an Ethernet Virtual Private Network (EVPN); the third tuple is <an ESI of the first RT-5E route, a first Ethernet tag identifier field of the first RT-5E route>; and the first tuple, the second tuple, and the third tuple are able to be completely or partially the same.

10. The method according to claim 5, further comprising:

the first ESI being an ESI corresponding to the IP-VRF instance to which the RT-5 route; a first Ethernet tag identifier field of the RT-5 route being the second IP, and the first Ethernet tag identifier field of the RT-1 route being the second IP; and an ESI field of the RT-1 route being the first ESI.

11. The method according to claim 10, further comprising: publishing a second routing message by the first device, wherein the second routing message is an RT-1 routing message, an ESI of the second routing message is the first ESI, and a first Ethernet tag identifier field of the second routing message is the second IP;

or, still publishing a GW-IP as an RT-5G route of the second IP when the first device receives a route indicating that the second IP is able to be reached by means of a node T but do not receive an RT-1 route published by the node T, or when the first device receives an RT-1 route published by a node K but do not receive a route indicating that the second IP is able to be reached by means of the node K, otherwise, publishing the RT-5 route, wherein an ESI in the RT-1 route is the first ESI, the first Ethernet tag identifier field is the second IP, and the node T and the node K are any two PE nodes in the EVPN.

12. The method according to claim 10, further comprising:

according to the RT-1 route corresponding to <first ESI, first Ethernet tag ID> being <ESI, first Ethernet tag ID>, performing, by the first device, Designated Forwarder (DF) election affected by an AC.

13. The method according to claim 10, further comprising:

according to the RT1 route being the <first ESI, first Ethernet tag ID>, performing, by the third device, DF election affected by the AC.

14. The method according to claim 10, wherein before the second routing message is published, the method further comprises:

instructing the first device to publish the second routing message.

15. The method according to claim 10, further comprising:

updating the RT-1 route to enable the updated RT-1 route to carry a Primary/Backup attribute that is set according to a DF election result.

16. The method according to claim 5, wherein before the RT-5 route is published, the method further comprises:

instructing the first device to publish the RT-5 route;

or, the method further comprising:

when the ESI field of the RT-5 routing message carries the first ESI, the RT-5 routing message being further configured to indicate a data message that is forwarded to the CE-Prefix by the limited RT-5 node according to forward information in the RT-1 route.

17. The method according to claim 5, wherein before the first device publishes the RT-5 routing message for the CE-Prefix to enable the limited RT-5 node to receive the RT-5 routing message, the method further comprises:

determining whether the first device receives the RT-1 route corresponding to the first ESI;

when the first device receives the RT-1 route corresponding to the first ESI, carrying the first ESI in the ESI field of the RT-5 routing message; and when the first device does not receive the RT-1 route corresponding to the first ESI, carrying the second IP in the GW-IP field of the RT-5 routing message.

18. An electronic apparatus, comprising a memory and a processor, wherein the memory stores a computer program; and the processor is configured to execute the computer program to implement the method for publishing an RT-5G routing message, applied to a first device and comprising:

a first publishing module, configured to publish an RT-5G routing message for a Customer Edge (CE)-Prefix to enable a limited RT-5 node to receive the RT-5G routing message, wherein a GW-IP field of the RT-5G routing message carries a first Internet Protocol (IP); a next hop of Overlay of the CE-Prefix is a second IP, and the second IP is allowed to be reached by means of a node to which the first IP belongs; the RT-5G routing message is configured to instruct the limited RT-5 node to analyze the GW-IP field carried in the RT-5G routing message into an RT-2 route; and the second IP is not in a directly-connected subnet of an Ethernet Virtual Private Network EVPN).

19. A non-transitory computer-readable storage medium, having a computer program stored therein, wherein the computer program is configured to implement, when being executed, the method according to claim 1.

20. An electronic apparatus, comprising a memory and a processor, wherein the memory stores a computer program; and the processor is configured to execute the computer program to implement the method according to claim 1.

* * * * *